(12) United States Patent
Zhang et al.

(10) Patent No.: US 12,450,558 B2
(45) Date of Patent: Oct. 21, 2025

(54) SYSTEMS AND METHODS OF SELECTING AN IMAGE FROM A GROUP OF IMAGES OF A RETAIL PRODUCT STORAGE AREA

(71) Applicant: Walmart Apollo, LLC, Bentonville, AR (US)

(72) Inventors: Lingfeng Zhang, Dallas, TX (US); Mingquan Yuan, Flower Mound, TX (US); Paul Lewis Lobo, Irving, TX (US); Avinash M. Jade, Bangalore (IN); Zhichun Xiao, Plano, TX (US); William Craig Robinson, Jr., Centerton, AR (US); Zhaoliang Duan, Frisco, TX (US); Wei Wang, Dallas, TX (US); Han Zhang, Allen, TX (US); Raghava Balusu, Achanta (IN); Tianyi Mao, Chicago, IL (US)

(73) Assignee: Walmart Apollo, LLC, Bentonville, AR (US)

( * ) Notice: Subject to any disclaimer, the term of this patent is extended or adjusted under 35 U.S.C. 154(b) by 443 days.

(21) Appl. No.: 17/963,787

(22) Filed: Oct. 11, 2022

(65) Prior Publication Data

US 2024/0119735 A1  Apr. 11, 2024

(51) Int. Cl.
*G06Q 10/087* (2023.01)
*G06V 10/25* (2022.01)
(Continued)

(52) U.S. Cl.
CPC ........... *G06Q 10/087* (2013.01); *G06V 10/25* (2022.01); *G06V 10/762* (2022.01); *G06V 20/36* (2022.01); *G06V 20/52* (2022.01)

(58) Field of Classification Search
CPC ........ G06V 20/52; G06V 20/36; G06V 10/16; G06V 10/25; G06V 10/762; G06Q 10/087
See application file for complete search history.

(56) References Cited

U.S. PATENT DOCUMENTS 5,074,594 A  12/1991 Laganowski
6,570,492 B1  5/2003 Peratoner
(Continued)

FOREIGN PATENT DOCUMENTS

CN  106347550 B  8/2019
CN  110348439 B  10/2019
(Continued)

OTHER PUBLICATIONS

U.S. Appl. No. 17/963,751, filed Oct. 11, 2022, Yilun Chen.
(Continued)

*Primary Examiner* — John Villecco
(74) *Attorney, Agent, or Firm* — Foley IP Law, PLLC

(57) ABSTRACT

Systems and methods of monitoring inventory of a product storage facility include an image capture device configured to move about the product storage areas of the product storage facility and capture images of the product storage areas from various angles. A computing device coupled to the image capture device obtains the images of the product storage areas captured by the image capture device and processes the obtained images of the product storage areas to detect individual products captured in the obtained images. Based on detection of the individual products captured in the images, the computing device analyzes each of the obtained images to detect one or more adjacent product storage structures (shelves, pallets, etc.) and identifies and selects a single image that fully shows a product storage structure of interest and fully shows each of the products stored on the product storage structure of interest.

16 Claims, 14 Drawing Sheets

(51) Int. Cl.
  *G06V 10/762* (2022.01)
  *G06V 20/00* (2022.01)
  *G06V 20/52* (2022.01)

(56) References Cited

U.S. PATENT DOCUMENTS

| | | | |
|---|---|---|---|
| 8,923,650 B2 | 12/2014 | Wexler | |
| 8,965,104 B1 | 2/2015 | Hickman | |
| 8,972,291 B2 * | 3/2015 | Rimnac | H04N 23/90 705/28 |
| 9,275,308 B2 | 3/2016 | Szegedy | |
| 9,477,955 B2 | 10/2016 | Goncalves | |
| 9,526,127 B1 | 12/2016 | Taubman | |
| 9,576,310 B2 | 2/2017 | Cancro | |
| 9,659,204 B2 | 5/2017 | Wu | |
| 9,811,754 B2 * | 11/2017 | Schwartz | G06F 18/24 |
| 10,002,344 B2 | 6/2018 | Wu | |
| 10,019,803 B2 | 7/2018 | Venable | |
| 10,032,072 B1 | 7/2018 | Tran | |
| 10,129,524 B2 | 11/2018 | Ng | |
| 10,210,432 B2 | 2/2019 | Pisoni | |
| 10,366,365 B2 * | 7/2019 | Rimnac | H04N 23/90 |
| 10,373,116 B2 | 8/2019 | Medina | |
| 10,545,650 B2 * | 1/2020 | Bhide | G06F 3/04847 |
| 10,572,757 B2 | 2/2020 | Graham | |
| 10,592,854 B2 | 3/2020 | Schwartz | |
| 10,607,098 B2 * | 3/2020 | Liu | G06V 10/40 |
| 10,839,452 B1 | 11/2020 | Guo | |
| 10,861,086 B2 * | 12/2020 | Glaser | G06Q 30/0635 |
| 10,922,574 B1 | 2/2021 | Tariq | |
| 10,943,278 B2 | 3/2021 | Benkreira | |
| 10,956,711 B2 | 3/2021 | Adato | |
| 10,990,950 B2 | 4/2021 | Garner | |
| 10,991,036 B1 | 4/2021 | Bergstrom | |
| 11,036,949 B2 | 6/2021 | Powell | |
| 11,055,905 B2 | 7/2021 | Tagra | |
| 11,087,272 B2 | 8/2021 | Skaff | |
| 11,151,426 B2 | 10/2021 | Dutta | |
| 11,163,805 B2 | 11/2021 | Arocho | |
| 11,276,034 B2 | 3/2022 | Shah | |
| 11,282,287 B2 | 3/2022 | Gausebeck | |
| 11,295,163 B1 | 4/2022 | Schoner | |
| 11,308,775 B1 | 4/2022 | Sinha | |
| 11,409,977 B1 | 8/2022 | Glaser | |
| 12,125,055 B2 * | 10/2024 | Kang | G06Q 10/087 |
| 2005/0238465 A1 | 10/2005 | Razumov | |
| 2011/0040427 A1 | 2/2011 | Ben-Tzvi | |
| 2014/0002239 A1 | 1/2014 | Rayner | |
| 2014/0247116 A1 | 9/2014 | Davidson | |
| 2014/0279290 A1 * | 9/2014 | Rimnac | H04N 23/90 705/28 |
| 2014/0307938 A1 | 10/2014 | Doi | |
| 2015/0363660 A1 | 12/2015 | Vidal | |
| 2016/0203525 A1 | 7/2016 | Hara | |
| 2017/0106738 A1 | 4/2017 | Gillett | |
| 2017/0286773 A1 | 10/2017 | Skaff | |
| 2018/0005176 A1 | 1/2018 | Williams | |
| 2018/0018788 A1 | 1/2018 | Olmstead | |
| 2018/0197223 A1 | 7/2018 | Grossman | |
| 2018/0260772 A1 | 9/2018 | Chaubard | |
| 2019/0025849 A1 | 1/2019 | Dean | |
| 2019/0043003 A1 | 2/2019 | Fisher | |
| 2019/0050932 A1 | 2/2019 | Dey | |
| 2019/0087772 A1 | 3/2019 | Medina | |
| 2019/0163698 A1 | 5/2019 | Kwon | |
| 2019/0197561 A1 | 6/2019 | Adato | |
| 2019/0213535 A1 * | 7/2019 | Adato | G06F 16/235 |
| 2019/0220482 A1 | 7/2019 | Crosby | |
| 2019/0236531 A1 | 8/2019 | Adato | |
| 2020/0246977 A1 | 8/2020 | Swietojanski | |
| 2020/0265494 A1 | 8/2020 | Glaser | |
| 2020/0324976 A1 | 10/2020 | Diehr | |
| 2020/0356813 A1 | 11/2020 | Sharma | |
| 2020/0380226 A1 | 12/2020 | Rodriguez | |
| 2020/0387858 A1 | 12/2020 | Hasan | |
| 2021/0049541 A1 | 2/2021 | Gong | |
| 2021/0049542 A1 | 2/2021 | Dalal | |
| 2021/0142105 A1 | 5/2021 | Siskind | |
| 2021/0150231 A1 | 5/2021 | Kehl | |
| 2021/0192780 A1 | 6/2021 | Kulkarni | |
| 2021/0216954 A1 | 7/2021 | Chaubard | |
| 2021/0272269 A1 | 9/2021 | Suzuki | |
| 2021/0319684 A1 | 10/2021 | Ma | |
| 2021/0342914 A1 | 11/2021 | Dalal | |
| 2021/0398099 A1 * | 12/2021 | Adato | G06T 7/0006 |
| 2021/0400195 A1 | 12/2021 | Adato | |
| 2022/0043547 A1 | 2/2022 | Jahjah | |
| 2022/0051179 A1 | 2/2022 | Savvides | |
| 2022/0058425 A1 | 2/2022 | Savvides | |
| 2022/0067085 A1 | 3/2022 | Nihas | |
| 2022/0114403 A1 | 4/2022 | Shaw | |
| 2022/0114821 A1 | 4/2022 | Arroyo | |
| 2022/0138914 A1 | 5/2022 | Wang | |
| 2022/0165074 A1 | 5/2022 | Srivastava | |
| 2022/0222924 A1 | 7/2022 | Pan | |
| 2022/0262008 A1 | 8/2022 | Kidd | |
| 2024/0119409 A1 * | 4/2024 | Balusu | G06F 16/55 |
| 2024/0249506 A1 * | 7/2024 | Arora | G06V 10/945 |
| 2024/0265565 A1 * | 8/2024 | Zhang | G06T 7/70 |

FOREIGN PATENT DOCUMENTS

| | | |
|---|---|---|
| CN | 110443298 B | 2/2022 |
| CN | 114898358 A | 8/2022 |
| EP | 3217324 A1 | 9/2017 |
| EP | 3437031 | 2/2019 |
| EP | 3479298 | 5/2019 |
| JP | 2021103872 A * | 7/2021 |
| WO | 2006113281 A2 | 10/2006 |
| WO | 2017201490 A1 | 11/2017 |
| WO | 2018093796 | 5/2018 |
| WO | 2020051213 A1 | 3/2020 |
| WO | 2021186176 A1 | 9/2021 |
| WO | 2021247420 A2 | 12/2021 |

OTHER PUBLICATIONS

U.S. Appl. No. 17/963,802, filed Oct. 11, 2022, Lingfeng Zhang.
U.S. Appl. No. 17/963,903, filed Oct. 11, 2022, Raghava Balusu.
U.S. Appl. No. 17/966,580, filed Oct. 14, 2022, Paarvendhan Puviyarasu.
U.S. Appl. No. 17/971,350, filed Oct. 21, 2022, Jing Wang.
U.S. Appl. No. 17/983,773, filed Nov. 9, 2022, Lingfeng Zhang.
Chaudhuri, Abon et al.; "A Smart System for Selection of Optimal Product Images in E-Commerce"; 2018 IEEE Conference on Big Data (Big Data); Dec. 10-13, 2018; IEEE; < https://ieeexplore.ieee.org/document/8622259>; pp. 1728-1736.
Chenze, Brandon et al.; "Iterative Approach for Novel Entity Recognition of Foods in Social Media Messages"; 2022 IEEE 23rd International Conference on Information Reuse and Integration for Data Science (IRI); Aug. 9-11, 2022; IEEE; <https://ieeexplore.ieee.org/document/9874231>; pp. 126-131.
Naver Engineering Team; "Auto-classification of NAVER Shopping Product Categories using TensorFlow"; < https://blog.tensorflow.org/2019/05/auto-classification-of-naver-shopping.html>; May 20, 2019; pp. 1-13.
Paolanti, Marine et al.; "Mobile robot for retail surveying and inventory using visual and textual analysis of monocular pictures based on deep learning"; European Conference on Mobile Robots; Sep. 2017, 6 pages.
Ramanpreet Kaur et al.; "A Brief Review on Image Stitching and Panorama Creation Methods"; International Journal of Control Theory and Applications; 2017; vol. 10, No. 28; International Science Press; Gurgaon, India; < https://www.researchgate.net/publication/348232877 >; 11 pages.
Refills; "Final 3D object perception and localization"; European Commision, Dec. 31, 2016, 16 pages.
Retech Labs; "Storx | RetechLabs"; <https://retechlabs.com/storx/>; available at least as early as Jun. 22, 2019; retrieved from

(56) References Cited

OTHER PUBLICATIONS

Internet Archive Wayback Machine <https://web.archive.org/web/20190622012152/https://retechlabs.com/storx/> on Dec. 1, 2022; pp. 1-4.

Schroff, Florian et al.; "Facenet: a unified embedding for face recognition and clustering"; 2015 IEEE Conference on Computer Vision and Pattern Recognition (CVPR); Jun. 7-12, 2015; IEEE; <https://ieeexplore.ieee.org/document/7298682>; pp. 815-823.

Singh, Ankit; "Automated Retail Shelf Monitoring Using AI"; <https://blog.paralleldots.com/shelf-monitoring/automated-retail-shelf-monitoring-using-ai/>; Sep. 20, 2019; pp. 1-12.

Singh, Ankit; "Image Recognition and Object Detection in Retail"; <https://blog.paralleldots.com/featured/image-recognition-and-object-detection-in-retail/>; Sep. 26, 2019; pp. 1-11.

Tan, Mingxing et al.; "EfficientDet: Scalable and Efficient Object Detection"; 2020 IEEE/CVF Conference on Computer Vision and Pattern Recognition (CVPR); Jun. 13-19, 2020; IEEE; <https://ieeexplore.ieee.org/document/9156454>; pp. 10778-10787.

Tan, Mingxing et al.; "EfficientNet: Rethinking Model Scaling for Convolutional Neural Networks"; Proceedings of the 36th International Conference on Machine Learning; 2019; vol. 97; PLMR; <http://proceedings.mlr.press/v97/tan19a.html>; pp. 6105-6114.

Technology Robotix Society; "Colour Detection"; <https://medium.com/image-processing-in-robotics/colour-detection-e15bc03b3f61>; Jul. 2, 2019; pp. 1-8.

Tonioni, Alessio et al.; "A deep learning pipeline for product recognition on store shelves"; 2018 IEEE International Conference on Image Processing, Applications and Systems (IPAS); Dec. 12-14, 2018; IEEE; <https://ieeexplore.ieee.org/document/8708890>; pp. 25-31.

Trax Retail; "Image Recognition Technology for Retail | Trax"; <https://traxretail.com/retail/>; available at least as early as Apr. 20, 2021; retrieved from Internet Wayback Machine <https://web.archive.org/web/20210420132348/https://traxretail.com/retail/> on Dec. 1, 2022; pp. 1-19.

Verma, Nishchal et al.; "Object identification for inventory management using convolutional neural network"; IEEE Applied Imagery Pattern Recognition Workshop (AIPR); Oct. 2016, 6 pages.

* cited by examiner

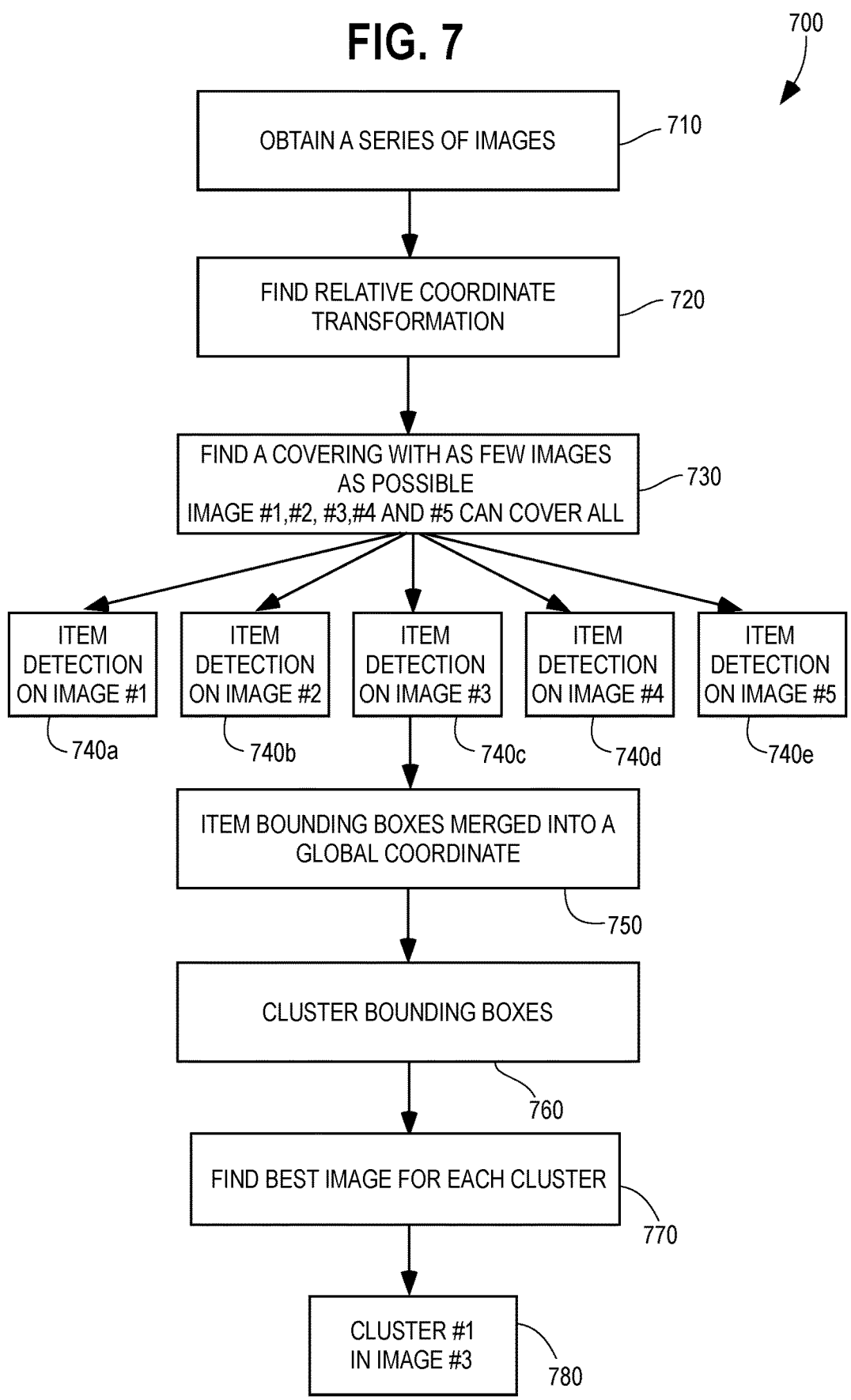

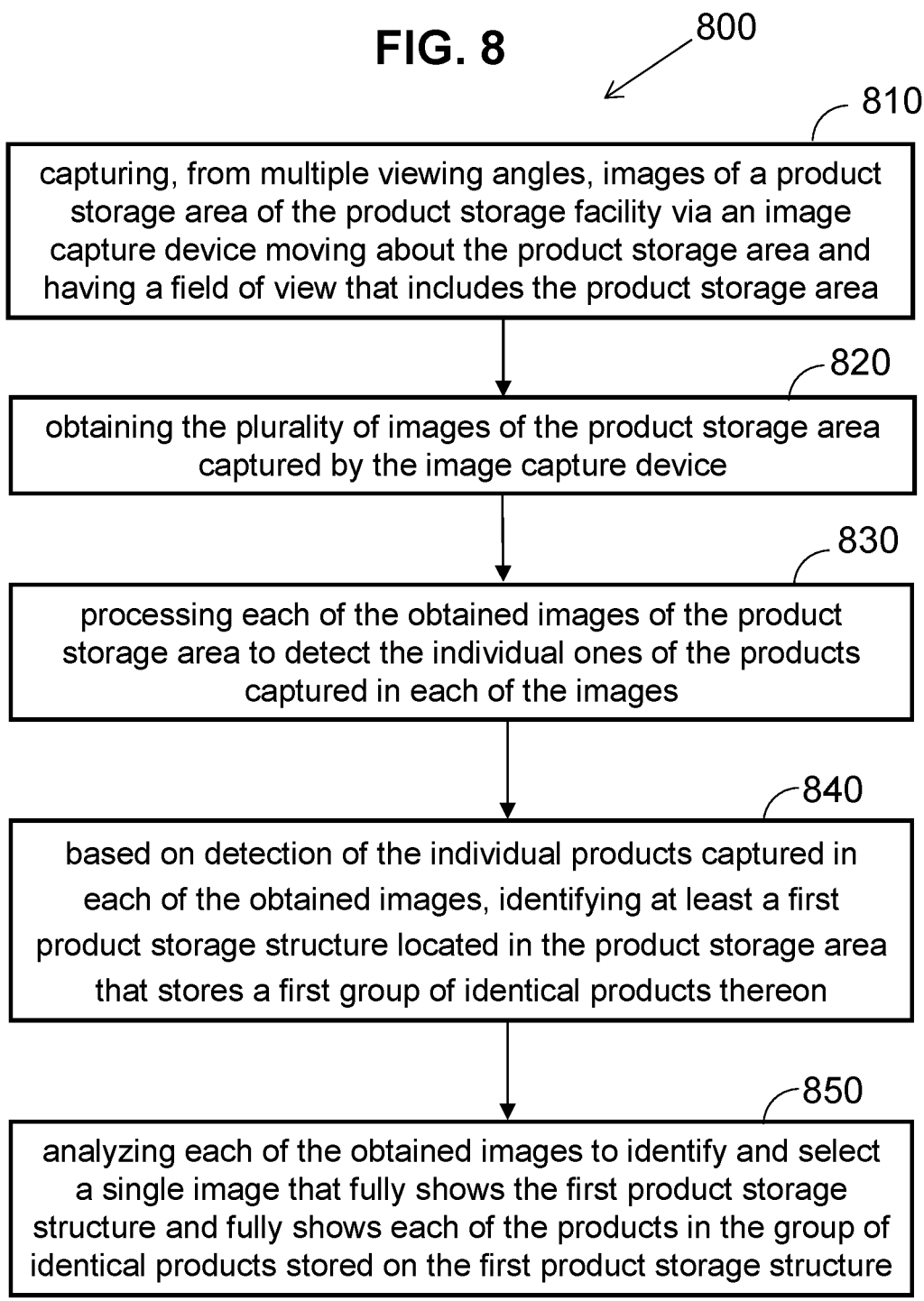

SYSTEMS AND METHODS OF SELECTING AN IMAGE FROM A GROUP OF IMAGES OF A RETAIL PRODUCT STORAGE AREA

TECHNICAL FIELD

This invention relates generally to managing inventory at product storage facilities, and in particular, to processing digital images of product storage structures of product storage facilities to monitor on-hand inventory at the product storage facilities.

BACKGROUND

A typical product storage facility (e.g., a retail store, a product distribution center, a warehouse, etc.) may have hundreds of shelves and thousands of products stored on the shelves or on pallets. It is common for workers of such product storage facilities to manually (e.g., visually) inspect product display shelves and/or pallet storage areas to determine which of the products are adequately stocked and which products are or will soon be out of stock and need to be replenished.

Given the very large number of product storage areas such as shelves, pallets, and other product displays at product storage facilities of large retailers, and the even larger number of products stored in the product storage areas, manual inspection of the products on the shelves/pallets by the workers is very time consuming and significantly increases the operations cost for a retailer, since these workers could be performing other tasks if they were not involved in manually inspecting the product storage areas.

BRIEF DESCRIPTION OF THE DRAWINGS

Disclosed herein are embodiments of systems and methods of monitoring on-hand inventory at a product storage facility. This description includes drawings, wherein:

FIG. 7 is a flow diagram of an exemplary process of managing inventory at a product storage facility in accordance with some embodiments; and FIG. 8 is another flow diagram of an exemplary process of managing inventory at a product storage facility in accordance with some embodiments.

Figure 1:
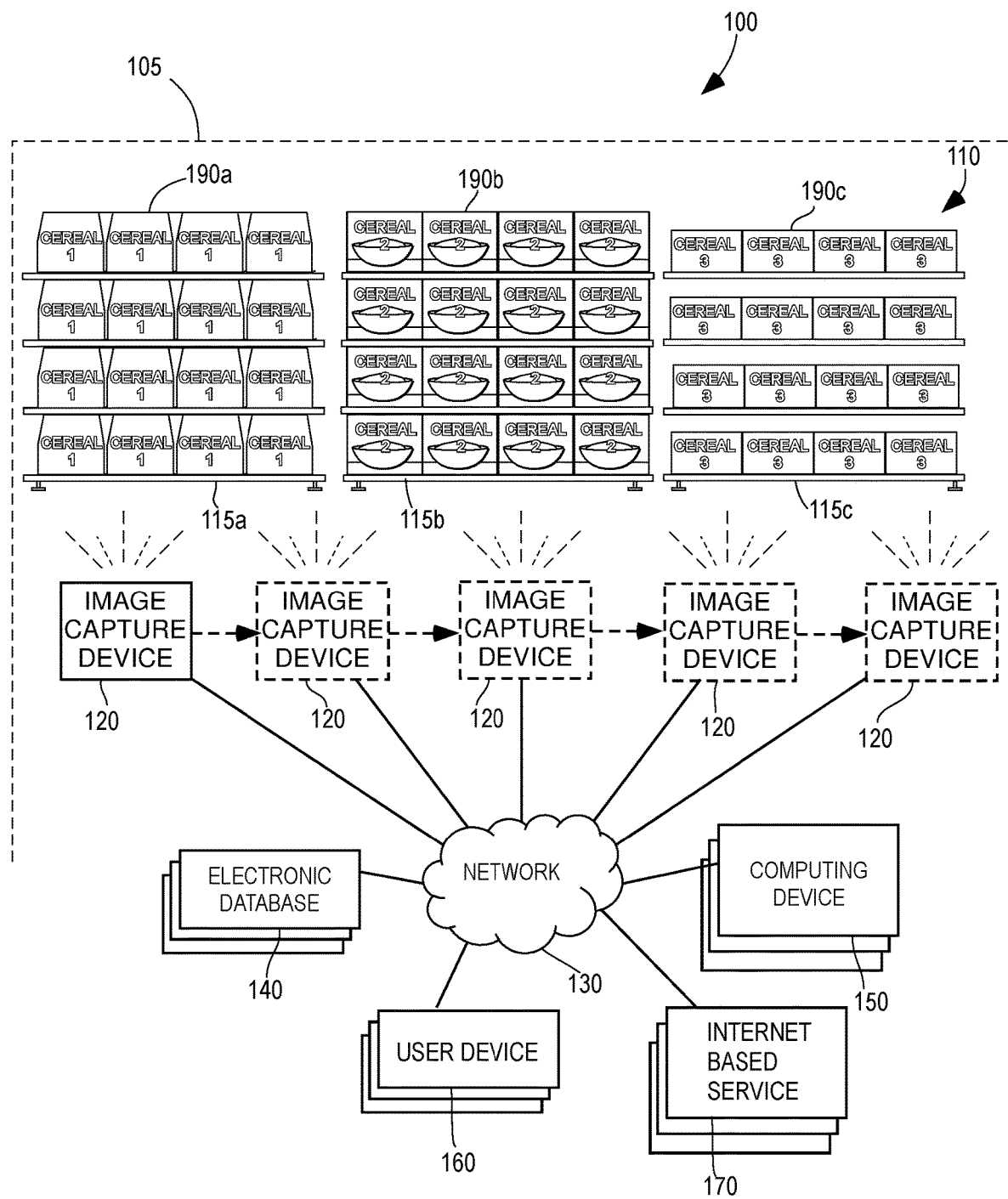
FIG. 1 is a diagram of an exemplary system of monitoring inventory at a product storage facility in accordance with some embodiments, depicting a front view of a product storage area storing groups of various individual products that is being monitored by an image capture device.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required.

The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Systems and methods of monitoring inventory of a product storage facility include an image capture device configured to move about the product storage areas of the product storage facility and capture images of the product storage areas from various angles. A computing device coupled to the image capture device obtains the images of the product storage areas captured by the image capture device and processes each of the obtained images of the product storage areas to detect the individual products captured in the obtained images. Based on detection of the individual products captured in the images, the computing device analyzes each of the obtained images to detect one or more adjacent product storage structures (shelves, pallets, etc.) and then identifies and selects a single image that fully shows a product storage structure of interest and fully shows each of the products stored on the product storage structure of interest. As such, the systems/methods process a series of digital images of a given product storage structure (e.g., a pallet, a shelf cabinet, a single shelf, another product display, etc.) taken by a movable digital image capture device, and select an image that provides the most complete (e.g., full front) view of the product storage structure and the products stocked on that product storage structure.

In some embodiments, a system for monitoring inventory of a product storage facility includes an image capture device having a field of view that includes a product storage area of the product storage facility having products arranged therein. The image capture device is configured to move about the product storage area and capture a plurality of images of the product storage area from a plurality of viewing angles. The system further includes a computing device including a control circuit and communicatively coupled to the image capture device. The control circuit is configured to: obtain the plurality of images of the product storage area captured by the image capture device; process each of the obtained images of the product storage area to detect individual ones of each of the products captured in each of the obtained images; based on detection of the individual ones of each of the products captured in each of the obtained images, identify at least a first product storage structure located in the product storage area that stores a first group of identical products thereon; and analyze each of the obtained images to identify and select a single image that fully shows the first product storage structure and fully shows each of the products in the group of identical products stored on the first product storage structure.

In some embodiments, a method of monitoring inventory of a product storage facility includes: capturing, from a plurality of viewing angles, a plurality of images of a product storage area of the product storage facility having products arranged therein via an image capture device moving about the product storage area and having a field of view that includes the product storage area. The method further includes, by a computing device including a control circuit and communicatively coupled to the image capture device: obtaining the plurality of images of the product storage area captured by the image capture device; processing each of the obtained images of the product storage area to detect individual ones of each of the products captured in each of the obtained images; based on detection of the individual packages of each of the products captured in each of the obtained images, identifying at least a first product storage structure located in the product storage area that stores a first group of identical products thereon; and analyzing each of the obtained images to identify and select a single image that fully shows the first product storage structure and fully shows each of the products in the group of identical products stored on the first product storage structure.

FIG. 1 shows an embodiment of a system 100 of monitoring inventory of a product storage facility 105 (which may be a retail store, a product distribution center, a warehouse, etc.). The system 100 is illustrated in FIG. 1 for simplicity with only one movable image capture device 120 that moves about one product storage area 110 containing three separate product storage structures 115a, 115b, and 115c, but it will be appreciated that, depending on the size of the product storage facility 105 being monitored, the system 100 may include multiple movable image capture devices 120 located throughout the product storage facility 105 that monitor hundreds of product storage areas 110 of and thousands of product storage structures 115a-115c. It is understood the direction and type of movement of the image capture device 120 about the product storage area 110 of the product storage facility 105 may depend on the physical arrangement of the product storage area 110 and/or the size and shape of the product storage structure 115. For example, the image capture device 120 may move linearly down an aisle alongside a product storage structure 115 (e.g., a shelving unit), or may move in a circular fashion around a table having curved or multiple sides.

Notably, the term "product storage structure" as used herein generally refers to a structure on which products 190a-190c are stored, and may include a pallet, a shelf cabinet, a single shelf, table, rack, refrigerator, freezer, displays, bins, gondola, case, countertop, or another product display. Likewise, it will be appreciated that the number of individual products 190a-190c representing three exemplary distinct products (labeled as "Cereal 1," "Cereal 2," and "Cereal 3") is chosen by way of example only. Further, the size and shape of the products 190a-190c in FIG. 1 have been shown by way of example only, and it will be appreciated that the individual products 190a-190c may have various sizes and shapes. Notably, the term products 190 may refer to individual products 190 (some of which may be single-piece/single-component products and some of which may be multi-piece/multi-component products), as well as to packages or containers of products 190, which may be plastic- or paper-based packaging that includes multiple units of a given product 190 (e.g., a plastic wrap that includes 36 rolls of identical paper towels, a paper box that includes 10 packs of identical diapers, etc.). Alternatively, the packaging of the individual products 190 may be a plastic- or paper-based container that encloses one individual product 190 (e.g., a box of cereal, a bottle of shampoo, etc.).

The image capture device 120 (also referred to as an image capture unit) of the exemplary system 100 depicted in FIG. 1 is configured for movement about the product storage facility 105 (e.g., on the floor via a motorized or non-motorized wheel-based and/or track-based locomotion system, or via slidable tracks above the floor, etc.) such that, when moving (e.g., about an aisle or other area of a product storage facility 105), the image capture device 120 is has a field of view that includes at least a portion of one or more of the product storage structures 115a-115c within a given product storage area 110 of the product storage facility 105, permitting the image capture device 120 to capture multiple images of the product storage area 110 from various viewing angles. In some embodiments, the image capture device 120 is configured as robotic device that moves without being physically operated/manipulated by a human operator (as described in more detail below). In other embodiments, the image capture device 120 is configured to be driven or manually pushed (e.g., like a cart or the like) by a human operator. In still further embodiments, the image capture device 120 may be a hand-held or a wearable device (e.g., a camera, phone, tablet, or the like) that may be carried and/or work by a worker at the product storage facility 105 while the worker moves about the product storage facility 105. In some embodiments, the image capture device 120 may be incorporated into another mobile device (e.g., a floor cleaner, floor sweeper, forklift, etc.), the primary purpose of which is independent of capturing images of product storage areas 110 of the product storage facility 105.

In some embodiments, as will be described in more detail below, the images of the product storage area 110 captured by the image capture device 120 while moving about the product storage area 110 are transmitted by the image capture device 120 over a network 130 to an electronic database 140 and/or to a computing device 150. In some aspects, the computing device 150 (or a separate image processing internet based/cloud-based service module) is configured to process such images as will be described in more detail below.

The exemplary system 100 includes an electronic database 140. Generally, the exemplary electronic database 140 of FIG. 1 may be configured as a single database, or a collection of multiple communicatively connected databases (e.g., digital image database, meta data database, inventory database, pricing database, customer database, vendor database, manufacturer database, etc.) and is configured to store various raw and processed images (e.g., 180a-180e, 182a-182e, 184a-184e) of the product storage area 110 captured by the image capture device 120 while the image capture device 120 is moving about the product storage facility 105. In some embodiments, the electronic database 140 and the computing device 150 may be implemented as two separate physical devices located at the product storage facility 105. It will be appreciated, however, that the computing device 150 and the electronic database 140 may be implemented as a single physical device and/or may be located at different (e.g., remote) locations relative to each other and relative to the product storage facility 105. In some aspects, the electronic database 140 may be stored, for example, on non-volatile storage media (e.g., a hard drive, flash drive, or removable optical disk) internal or external to the computing device 150, or internal or external to computing devices distinct from the computing device 150. In some embodiments, the electronic database 140 may be cloud-based.

The system 100 of FIG. 1 further includes a computing device 150 (which may be one or more computing devices as pointed out below) configured to communicate with the electronic database 140 (which may be one or more databases as pointed out below), the image capture device 120, user device 160 (which may be one or more user devices as pointed out below), and/or internet-based service 170 (which may be one or more internet-based services as pointed out below) over the network 130. The exemplary network 130 depicted in FIG. 1 may be a wide-area network (WAN), a local area network (LAN), a personal area network (PAN), a wireless local area network (WLAN), Wi-Fi, Zigbee, Bluetooth (e.g., Bluetooth Low Energy (BLE) network), or any other internet or intranet network, or combinations of such networks. Generally, communication between various electronic devices of system 100 may take place over hard-wired, wireless, cellular, Wi-Fi or Bluetooth networked components or the like. In some embodiments, one or more electronic devices of system 100 may include cloud-based features, such as cloud-based memory storage. In some embodiments, the one or more computing devices 150, one or more electronic databases 140, one or more user devices 160, and/or portions of the network 130 are located at, or in the product storage facility 105.

The computing device 150 may be a stationary or portable electronic device, for example, a desktop computer, a laptop computer, a single server or a series of communicatively connected servers, a tablet, a mobile phone, or any other electronic device including a control circuit (i.e., control unit) that includes a programmable processor. The computing device 150 may be configured for data entry and processing as well as for communication with other devices of system 100 via the network 130. As mentioned above, the computing device 150 may be located at the same physical location as the electronic database 140, or may be located at a remote physical location relative to the electronic database 140.

Figure 2:
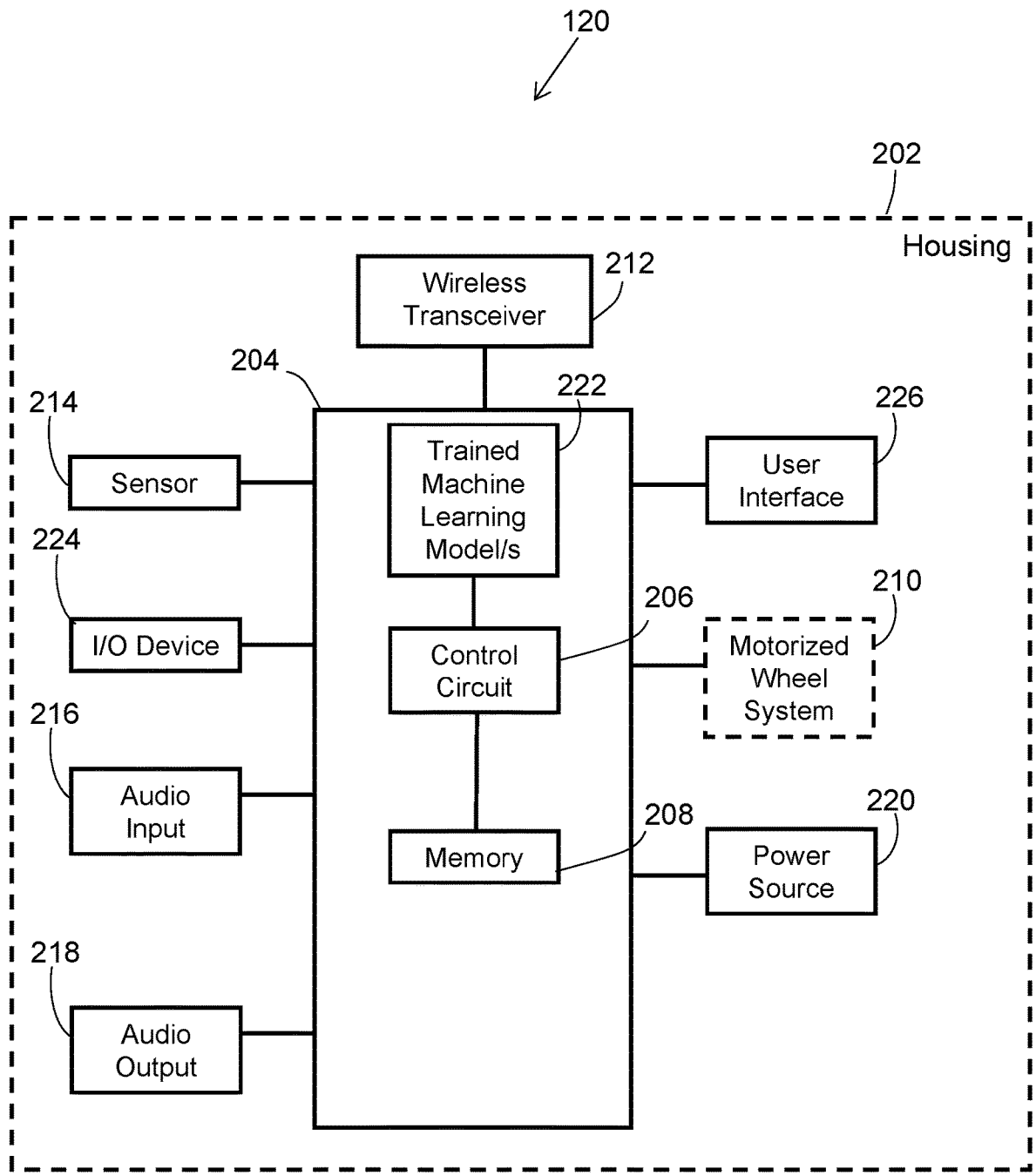
FIG. 2 comprises a block diagram of an exemplary image capture device in accordance with some embodiments.

FIG. 2 presents a more detailed example of an exemplary motorized robotic image capture device 120. As mentioned above, the image capture device 102 does not necessarily need an autonomous motorized wheel-based and/or track-based system to move about the product storage facility 105, and may instead be moved (e.g., driven, pushed, carried, worn, etc.) by a human operator, or may be movably coupled to a track system (which may be above the floor level or at the floor level) that permits the image capture device 120 to move about the product storage facility 105 while capturing images of various product storage areas 110 of the product storage facility 105. In the example shown in FIG. 2, the motorized image capture device 120 has a housing 202 that contains (partially or fully) or at least supports and carries a number of components. These components include a control unit 204 comprising a control circuit 206 that controls the general operations of the motorized image capture device 120 (notably, in some implementations, the control circuit 310 of the computing device 150 may control the general operations of the image capture device 120). Accordingly, the control unit 204 also includes a memory 208 coupled to the control circuit 206 and that stores, for example, computer program code, operating instructions and/or useful data, which when executed by the control circuit implement the operations of the image capture device.

The control circuit 206 of the exemplary motorized image capture device 120 of FIG. 2, operably couples to a motorized wheel system 210, which, as pointed out above, is optional (and for this reason represented by way of dashed lines in FIG. 2). This motorized wheel system 210 functions as a locomotion system to permit the image capture device 120 to move within the product storage facility 105 (thus, the motorized wheel system 210 may be more generically referred to as a locomotion system). Generally, this motorized wheel system 210 may include at least one drive wheel (i.e., a wheel that rotates about a horizontal axis) under power to thereby cause the image capture device 120 to move through interaction with, e.g., the floor of the product storage facility 105. The motorized wheel system 210 can include any number of rotating wheels and/or other alternative floor-contacting mechanisms (e.g., tracks, etc.) as may be desired and/or appropriate to the application setting.

The motorized wheel system 210 may also include a steering mechanism of choice. One simple example may comprise one or more wheels that can swivel about a vertical axis to thereby cause the moving image capture device 120 to turn as well. It should be appreciated that the motorized wheel system 210 may be any suitable motorized wheel and track system known in the art capable of permitting the image capture device 120 to move within the product storage facility 105. Further elaboration in these regards is not provided here for the sake of brevity save to note that the aforementioned control circuit 206 is configured to control the various operating states of the motorized wheel system 210 to thereby control when and how the motorized wheel system 210 operates.

In the exemplary embodiment of FIG. 2, the control circuit 206 operably couples to at least one wireless transceiver 212 that operates according to any known wireless protocol. This wireless transceiver 212 can comprise, for example, a Wi-Fi-compatible and/or Bluetooth-compatible transceiver (or any other transceiver operating according to known wireless protocols) that can wirelessly communicate with the aforementioned computing device 150 via the aforementioned network 130 of the product storage facility 105. So configured, the control circuit 206 of the image capture device 120 can provide information to the computing device 150 (via the network 130) and can receive information and/or movement instructions from the computing device 150. For example, the control circuit 206 can receive instructions from the computing device 150 via the network 130 regarding directional movement (e.g., specific predetermined routes of movement) of the image capture device 120 throughout the space of the product storage facility 105. These teachings will accommodate using any of a wide variety of wireless technologies as desired and/or as may be appropriate in a given application setting. These teachings will also accommodate employing two or more different wireless transceivers 212, if desired.

In the embodiment illustrated in FIG. 2, the control circuit 206 also couples to one or more on-board sensors 214 of the image capture device 120. These teachings will accommodate a wide variety of sensor technologies and form factors. According to some embodiments, the image capture device 120 can include one or more sensors 214 including but not limited to an optical sensor, a photo sensor, an infrared sensor, a 3-D sensor, a depth sensor, a digital camera sensor, a laser imaging, detection, and ranging (LIDAR) sensor, a mobile electronic device (e.g., a cell phone, tablet, or the like), a quick response (QR) code sensor, a radio frequency identification (RFID) sensor, a near field communication (NFC) sensor, a stock keeping unit (SKU) sensor, a barcode (e.g., electronic product code (EPC), universal product code (UPC), European article number (EAN), global trade item number (GTIN)) sensor, or the like.

By one optional approach, an audio input 216 (such as a microphone) and/or an audio output 218 (such as a speaker) can also operably couple to the control circuit 206. So configured, the control circuit 206 can provide a variety of audible sounds to thereby communicate with workers at the product storage facility 105 or other motorized image capture devices 120 moving about the product storage facility 105. These audible sounds can include any of a variety of tones and other non-verbal sounds. Such audible sounds can also include, in lieu of the foregoing or in combination therewith, pre-recorded or synthesized speech.

The audio input 216, in turn, provides a mechanism whereby, for example, a user (e.g., a worker at the product storage facility 105) provides verbal input to the control circuit 206. That verbal input can comprise, for example, instructions, inquiries, or information. So configured, a user can provide, for example, an instruction and/or query (e.g., where is pallet number so-and-so?, how many products are stocked on pallet number so-and-so? etc.) to the control circuit 206 via the audio input 216.

In the embodiment illustrated in FIG. 2, the motorized image capture device 120 includes a rechargeable power source 220 such as one or more batteries. The power provided by the rechargeable power source 220 can be made available to whichever components of the motorized image capture device 120 require electrical energy. By one approach, the motorized image capture device 120 includes a plug or other electrically conductive interface that the control circuit 206 can utilize to automatically connect to an external source of electrical energy to thereby recharge the rechargeable power source 220.

In some embodiments, the motorized image capture device 120 includes an input/output (I/O) device 224 that is coupled to the control circuit 206. The I/O device 224 allows an external device to couple to the control unit 204. The function and purpose of connecting devices will depend on the application. In some examples, devices connecting to the I/O device 224 may add functionality to the control unit 204, allow the exporting of data from the control unit 206, allow the diagnosing of the motorized image capture device 120, and so on.

In some embodiments, the motorized image capture device 120 includes a user interface 226 including for example, user inputs and/or user outputs or displays depending on the intended interaction with the user (e.g., worker at the product storage facility 105). For example, user inputs could include any input device such as buttons, knobs, switches, touch sensitive surfaces or display screens, and so on. Example user outputs include lights, display screens, and so on. The user interface 226 may work together with or separate from any user interface implemented at an optional user interface unit or user device 160 (such as a smart phone or tablet device) usable by a worker at the product storage facility 105. In some embodiments, the user interface 226 is separate from the image capture device 120, e.g., in a separate housing or device wired or wirelessly coupled to the image capture device 120. In some embodiments, the user interface 226 may be implemented in a mobile user device 160 carried by a person (e.g., worker at product storage facility 105) and configured for communication over the network 130 with the image capture device 120.

In some embodiments, the motorized image capture device 120 may be controlled by the computing device 150 or a user (e.g., by driving or pushing the image capture device 120 or sending control signals to the image capture device 120 via the user device 160) on-site at the product storage facility 105 or off-site. This is due to the architecture of some embodiments where the computing device 150 and/or user device 160 outputs the control signals to the motorized image capture device 120. These controls signals can originate at any electronic device in communication with the computing device 150 and/or motorized image capture device 120. For example, the movement signals sent to the motorized image capture device 120 may be movement instructions determined by the computing device 150; commands received at the user device 160 from a user; and commands received at the computing device 150 from a remote user not located at the product storage facility 105.

In the embodiment illustrated in FIG. 2, the control unit 204 includes a memory 208 coupled to the control circuit 206 and that stores, for example, computer program code, operating instructions and/or useful data, which when executed by the control circuit implement the operations of the image capture device. The control circuit 206 can comprise a fixed-purpose hard-wired platform or can comprise a partially or wholly programmable platform. These architectural options are well known and understood in the art and require no further description here. This control circuit 206 is configured (for example, by using corresponding programming stored in the memory 208 as will be well understood by those skilled in the art) to carry out one or more of the steps, actions, and/or functions described herein. The memory 208 may be integral to the control circuit 206 or can be physically discrete (in whole or in part) from the control circuit 206 as desired. This memory 208 can also be local with respect to the control circuit 206 (where, for example, both share a common circuit board, chassis, power supply, and/or housing) or can be partially or wholly remote with respect to the control circuit 206. This memory 208 can serve, for example, to non-transitorily store the computer instructions that, when executed by the control circuit 206, cause the control circuit 206 to behave as described herein.

In some embodiments, the control circuit 206 may be communicatively coupled to one or more trained computer vision/machine learning/neural network modules/models 222 to perform at some of the functions. For example, the control circuit 310 may be trained to process one or more images 180a-180e of product storage areas 110 at the product storage facility 105 to detect and/or recognize one or more products 190a-190c using one or more machine learning algorithms, including but not limited to Linear Regression, Logistic Regression, Decision Tree, SVM, Naïve Bayes, kNN, K-Means, Random Forest, Dimensionality Reduction Algorithms, and Gradient Boosting Algorithms. In some embodiments, the trained machine learning module/model 222 includes a computer program code stored in a memory 208 and/or executed by the control circuit 206 to process one or more images 180a-180c, as described in more detail below.

It is noted that not all components illustrated in FIG. 2 are included in all embodiments of the motorized image capture device 120. That is, some components may be optional depending on the implementation of the motorized image capture device 120. It will be appreciated that while the image capture device 120 of FIG. 2 is a motorized robotic device capable of moving about the product storage facility while being controlled remotely (e.g., by the computing device 150) and without being controlled by an onboard human operator, in some embodiments, the image capture device 120 may be configured to permit an onboard human operator (i.e., driver) to direct the movement of the image capture device 120 about the product storage facility 105.

Figure 3:
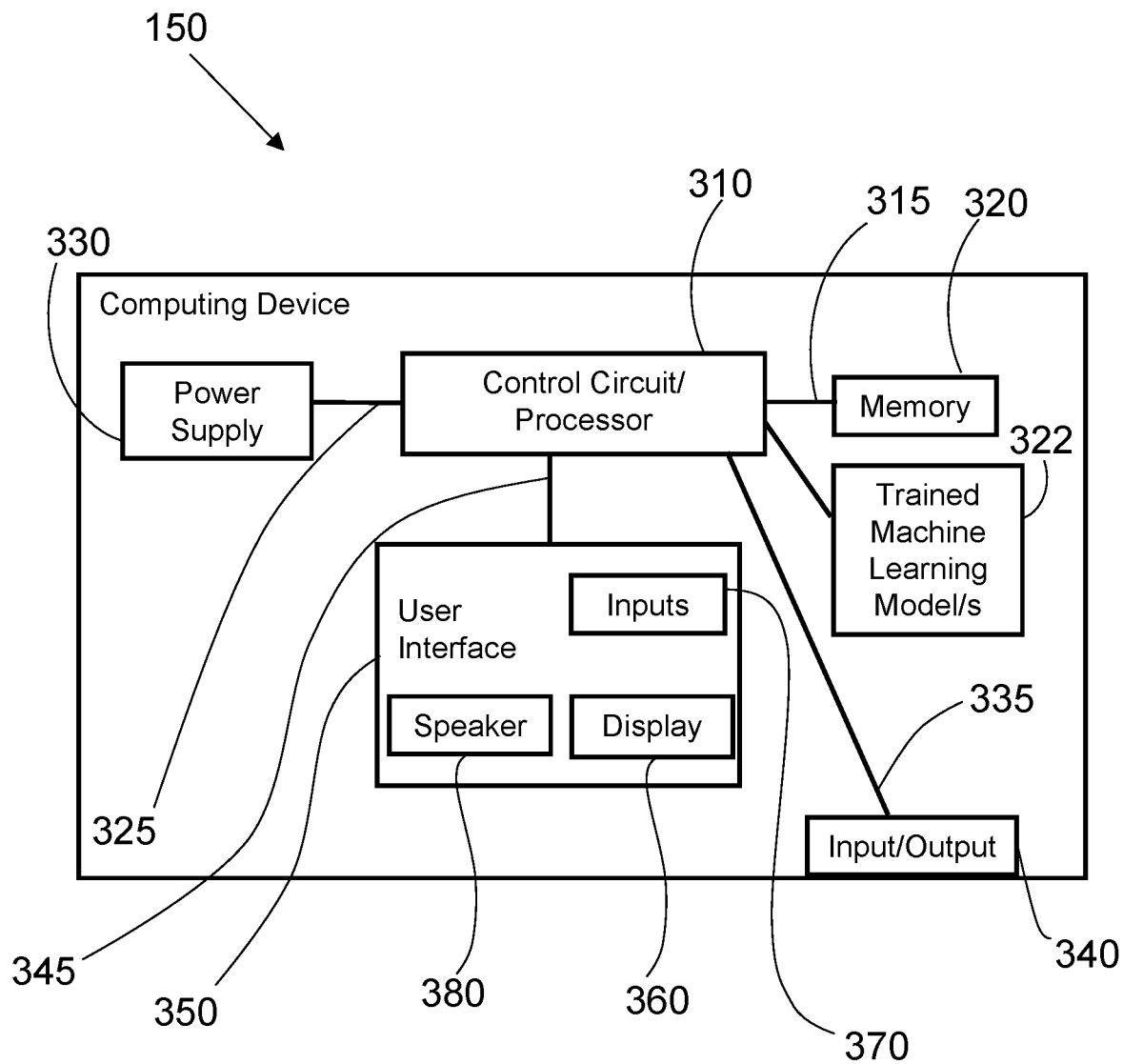
FIG. 3 is a functional block diagram of an exemplary computing device in accordance with some embodiments.

With reference to FIG. 3, the exemplary computing device 150 configured for use with exemplary systems and methods described herein may include a control circuit 310 including a programmable processor (e.g., a microprocessor or a microcontroller) electrically coupled via a connection 315 to a memory 320 and via a connection 325 to a power supply 330. The control circuit 310 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here.

The control circuit 310 can be configured (for example, by using corresponding programming stored in the memory 320 as will be well understood by those skilled in the art) to carry out one or more of the steps, actions, and/or functions described herein. In some embodiments, the memory 320 may be integral to the processor-based control circuit 310 or can be physically discrete (in whole or in part) from the control circuit 310 and is configured non-transitorily store the computer instructions that, when executed by the control circuit 310, cause the control circuit 310 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))). Accordingly, the memory and/or the control unit may be referred to as a non-transitory medium or non-transitory computer readable medium.

The control circuit 310 of the computing device 150 is also electrically coupled via a connection 335 to an input/output 340 that can receive signals from, for example, from the image capture device 120, the electronic database 140, internet-based service 170 (e.g., one or more of an image processing service, computer vision service, neural network service, etc.), and/or from another electronic device (e.g., an electronic device or user device 160 of a worker tasked with physically inspecting the product storage area 110 and/or the product storage structures 115a-115c and observing the individual products 190a-190c stocked thereon). The input/output 340 of the computing device 150 can also send signals to other devices, for example, a signal to the electronic database 140 including an image of a given product storage structure 115b selected by the control circuit 310 of the computing device 150 as fully showing the product storage structure 115b and each of the products 190b stored on the product storage structure 115b. Also, a signal may be sent by the computing device 150 via the input-output 340 to the image capture device 120 to, for example, provide a route of movement for the image capture device 120 through the product storage facility 105.

The processor-based control circuit 310 of the computing device 150 shown in FIG. 3 is electrically coupled via a connection 345 to a user interface 350, which may include a visual display or display screen 360 (e.g., LED screen) and/or button input 370 that provide the user interface 350 with the ability to permit an operator of the computing device 150 (e.g., worker at a the product storage facility 105 (or a worker at a remote regional center) tasked with monitoring the inventory at the product storage facility 105 to manually control the computing device 150 by inputting commands via touch-screen and/or button operation and/or voice commands. Possible commands may, for example, cause the computing device 150 to cause transmission of an alert signal to electronic mobile user device/s 160 of a worker/s at the product storage facility 105 to assign a task to the worker that requires the worker to, e.g., visually inspect and/or restock a given product storage structure 115a-115c based on analysis by the computing device 150 of the image of the product storage structure 115a-115c captured by the image capture device 120.

In some embodiments, the user interface 350 of the computing device 150 may also include a speaker 380 that provides audible feedback (e.g., alerts) to the operator of the computing device 150. It will be appreciated that the performance of such functions by the processor-based control circuit 310 of the computing device 150 is not dependent on a human operator, and that the control circuit 210 may be programmed to perform such functions without a human operator.

As pointed out above, in some embodiments, the image capture device 120 moves about the product storage facility 105 (while being controlled remotely by the computing device 150 (or another remote device such one or more user devices 160)), or while being controlled autonomously by the control circuit 206 of the image capture device 120), or while being manually driven or pushed by a worker of the product storage facility 105. When the image capture device 120 moves about the product storage area 110 as shown in FIG. 1, the sensor 214 of the image capture device 120, which may be one or more digital cameras, captures (in sequence and at predetermined intervals) multiple images 180a-180e (seen in FIGS. 4A-4E) of the product storage area 110 and the product storage structures 115a-115c from various angles. In some aspects, the control circuit 310 of the computing device 150 obtains (e.g., from the electronic database 140, or from an image-processing internet-based service 170 or directly from the image capture device 120) the raw or processed images 180a-180e of the product storage area 110 captured by the image capture device 120 while moving about the product storage area 110.

Figure 4A:
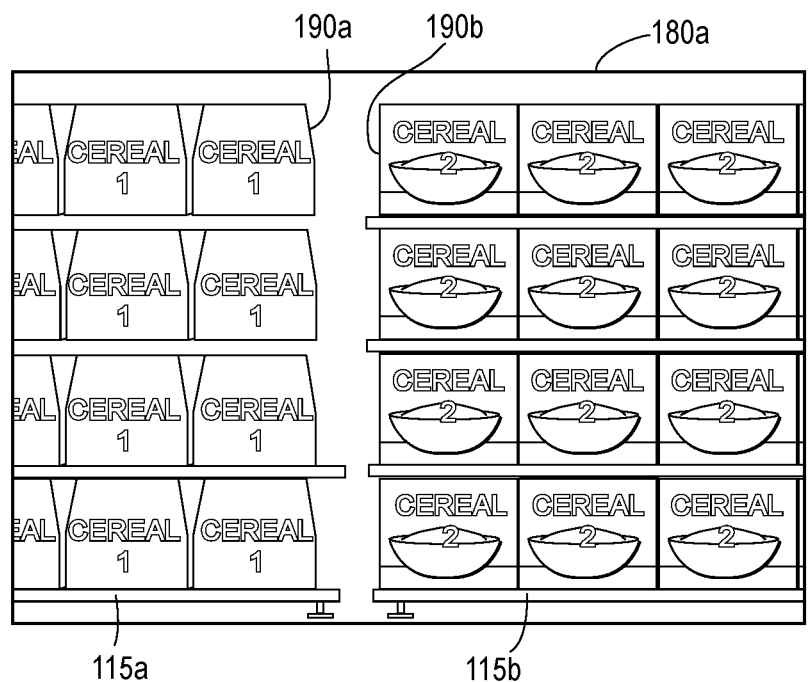
FIG. 4A is a diagram of an exemplary image taken by the image capture device at a first location relative to the product storage area as the image capture device of FIG. 1 moves about the product storage area of FIG. 1.
Figure 4B:
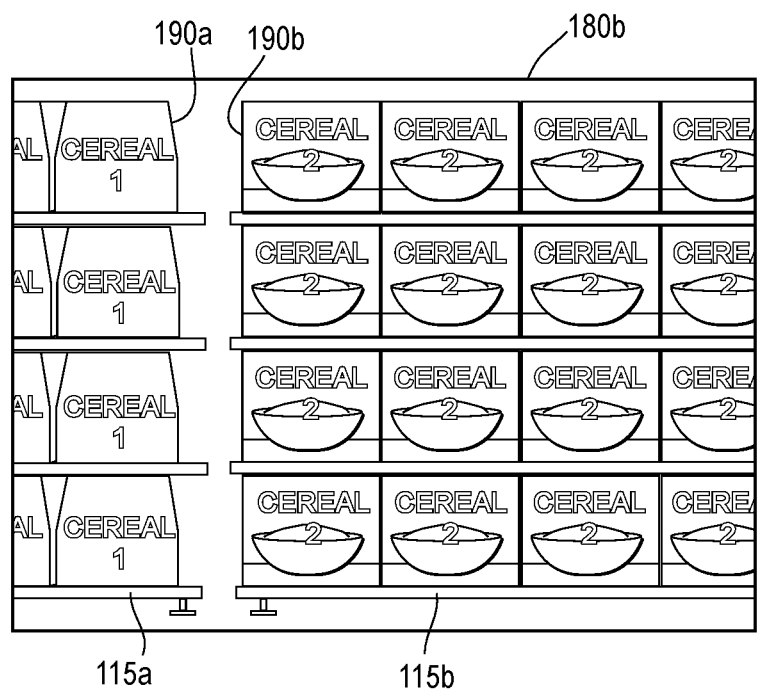
FIG. 4B is a diagram of an exemplary image taken by the image capture device at a second location relative to the product storage area as the image capture device moves further about the product storage area.
Figure 4C:
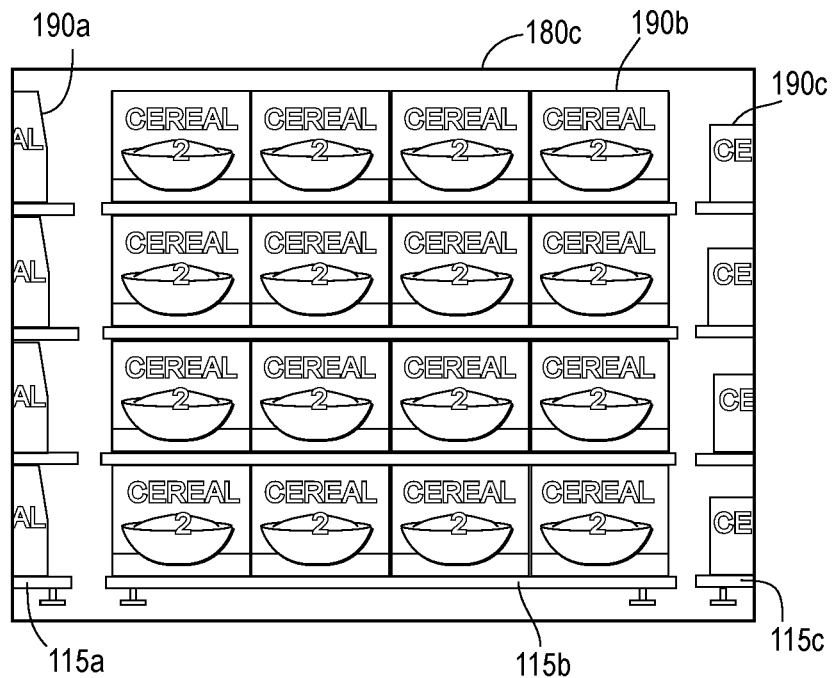
FIG. 4C is a diagram of an exemplary image taken by the image capture device at a third location relative to the product storage area as the image capture device moves even further about the product storage area.

The sensor 214 (e.g., digital camera) of the image capture device 120 is located and/or oriented on the image capture device 120 such that, when the image capture device 120 moves about the product storage area 110, the field of view of the sensor 214 includes only portions of adjacent product storage structures 115a-115c as shown in FIGS. 4A, 4B, 4D, and 4E, or an entire product storage structure 115b, as shown in FIG. 4C. In certain aspects, the image capture device 120 is configured to move about the product storage area 110 while capturing images of the product storage structures 115a-115c at certain predetermined time intervals (e.g., every 1 second, 5 seconds, 10 seconds, etc.).

Figure 4D:
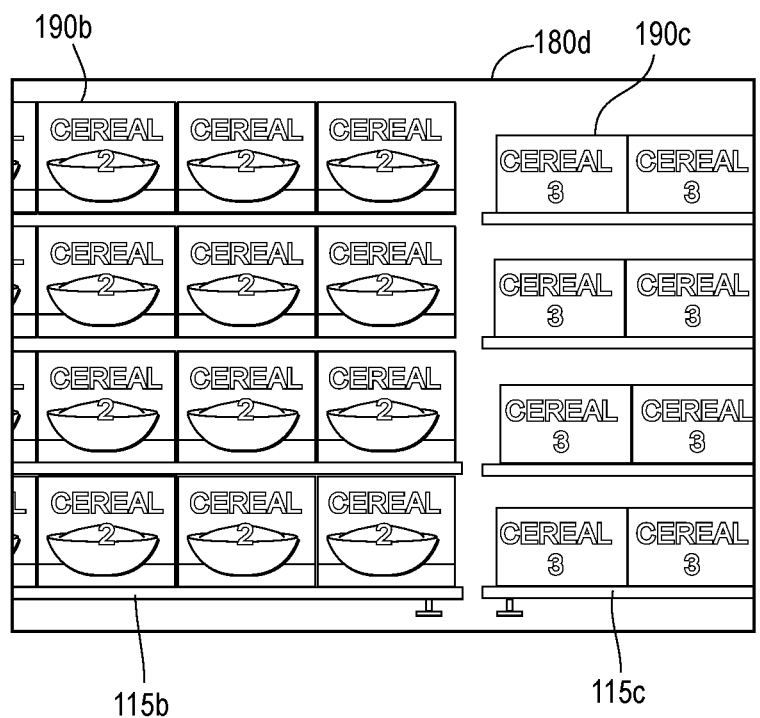
FIG. 4D is a diagram of an exemplary image taken by the image capture device at a fourth location relative to the product storage area as the image capture device moves even further about the product storage area.
Figure 4E:
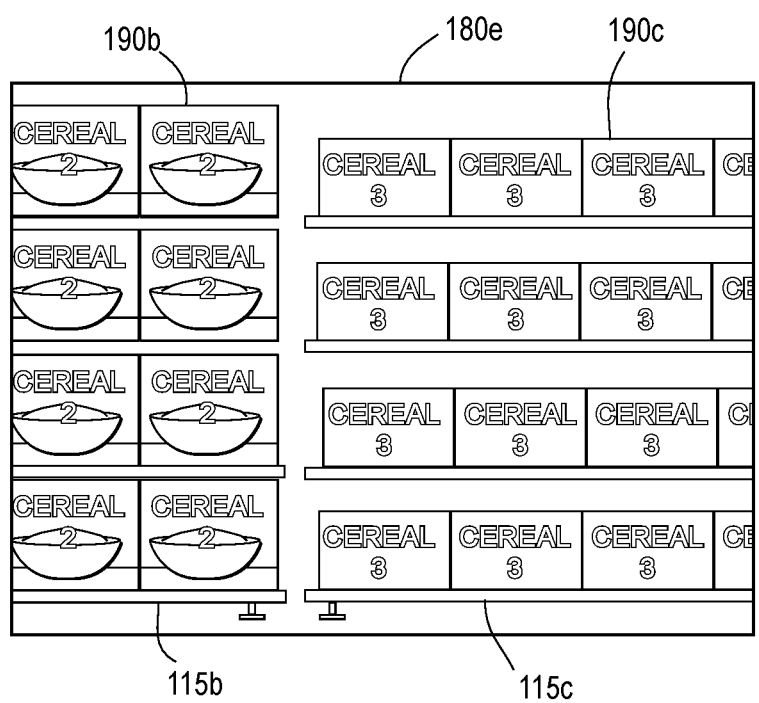
FIG. 4E is a diagram of an exemplary image taken by the image capture device at a fifth location relative to the product storage area as the image capture device moves even further about the product storage area.

The images captured by the image capture device 120 may be transmitted to the electronic database 140 for storage and/or to the computing device 150 for processing by the control circuit 310 and/or to a web-/cloud-based image processing service 170. In particular, since some of the images 180a-180e show overlapping portions of a given storage structure of interest (e.g., 115b), and some of the images 180a-180e show portions of two or more adjacent storage structures (e.g., 115a and 115b as shown in FIGS. 4A and 4B, 115a, 115b, and 115c as shown in FIG. 4C, or 115b and 115c as shown in FIGS. 4D and 4E), the control circuit 310 of the computing device 150 is programmed to process the images 180a-180e captured by the image capture device 120 to determine whether the set of images 180a-180e contains a single image (in the exemplary illustrated case, image 180c in FIG. 4C) that shows a full front view of the product storage structure 115b of interest (which may be a pallet, a shelf, or the like), as well as shows a full front view of all of the products 190b stocked on the product storage structure 115b of interest.

In particular, in some aspects, the control circuit 310 of the computing device 150 is programmed to process the images 180a-180e (captured by the image capture device 120 and obtained by the computing device 150 from the electronic database 140 or from the image capture device 120) to extract the raw image data and meta data from the images 180a-180e. In some aspects, the images 180a-180e may be processed via web-/cloud-based image processing service 170, which may be installed on the computing device 150 (or communicatively coupled to the computing device 150) and executed by the control circuit 310.

In some embodiments, the meta data extracted from the images 180a-180e captured by the image capture device 120, when processed by the control circuit 310 of the computing device 150, enables the control circuit 310 of the computing device 150 to detect the physical location of the portion of the product storage area 110 and/or product storage structure 115a-115c depicted in each of the images 180a-180e and/or the physical locations and characteristics (e.g., size, shape, etc.) of the individual products 190a-190c depicted in the images 180a-180e.

In some aspects, the control circuit 310 of the computing device 150 is configured to process the data extracted from each image 180a-180e captured by the image capture device 120 to detect the overall size and shape of each of the individual products 190a-190c on the portions of the product storage structures 115a-115c that are captured in each of the images 180a-180c. In some embodiments, the control circuit 310 is configured to process the data extracted from each image 180a-180c and detect each of the individual products 190a-190c in the images 180a-180c by executing one or more machine learning and/or computer vision modules and/or trained neural network modules/models 322. In certain aspects, the neural network executed by the control circuit 310 may be a deep convolutional neural network. The neural network module/model 322 may be trained using various data sets, including, but not limited to: raw image data extracted from the images 180a-180c captured by the image capture device 120; meta data extracted from the images 180a-180c captured by the image capture device 120; reference image data associated with reference images of various product storage structures 115a-115c at the product storage facility 105; reference images of various products 190a-190c stocked and/or sold at the product storage facility 105; and planogram data associated with the product storage facility 105.

In some embodiments, the control circuit 310 may be trained to process one or more images 180a-180e of product storage areas 110 at the product storage facility 105 to detect and/or recognize one or more products 190a-190c using one or more computer vision/machine learning algorithms, including but not limited to Linear Regression, Logistic Regression, Decision Tree, SVM, Naïve Bayes, kNN, K-Means, Random Forest, Dimensionality Reduction Algorithms, and Gradient Boosting Algorithms. In some embodiments, the trained machine learning/neural network module/model 322 includes a computer program code stored in a memory 320 and/or executed by the control circuit 310 to process one or more images 180a-180c, as described herein. It will be appreciated that, in some embodiments, the control circuit 310 does not process the raw images 180a-180e of FIGS. 4A-4E to result in the processed images 182a-182e of FIGS. 5A-5E, and that such processing is performed by an internet-based service 170, after which the processed image 182 is obtained by the control circuit 310 for further analysis.

In some aspects, the control circuit 310 is configured to process the data extracted from each image 180a-180e via computer vision and one or more trained neural networks to detect each of the individual products 190a-190c located at their respective product storage structures 115a-115c in each of the images 180a-180e (shown in FIGS. 4A-4E), and to generate virtual boundary lines 195a-195c (as seen in images 182a-182e in FIGS. 5A-5E) around each one of the individual products 190a-190c detected in the images 180a-180e.

As seen in the images 182a-182e in FIGS. 5A-5E, the virtual boundary lines 195a-195c extend about the outer edges of each of the individual products 190a-190c located on the product storage structures 115a-115c, and form a perimeter around each of the individual products 190a-190c. Generally, the control circuit 310 is programmed to interpret each of the virtual boundary lines 195a-195c as surrounding only one individual product 190a-190c.

Figure 5A:
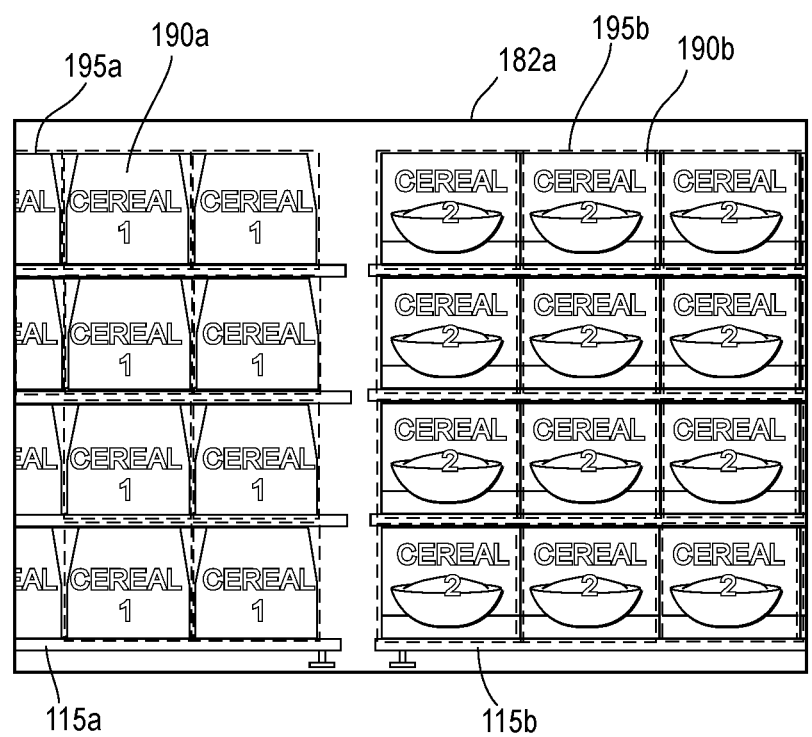
FIG. 5A is a diagram of the image of FIG. 4A, after the image is processed to detect the individual products and to generate a virtual boundary line around each of the individual products detected in the image.
Figure 5B:
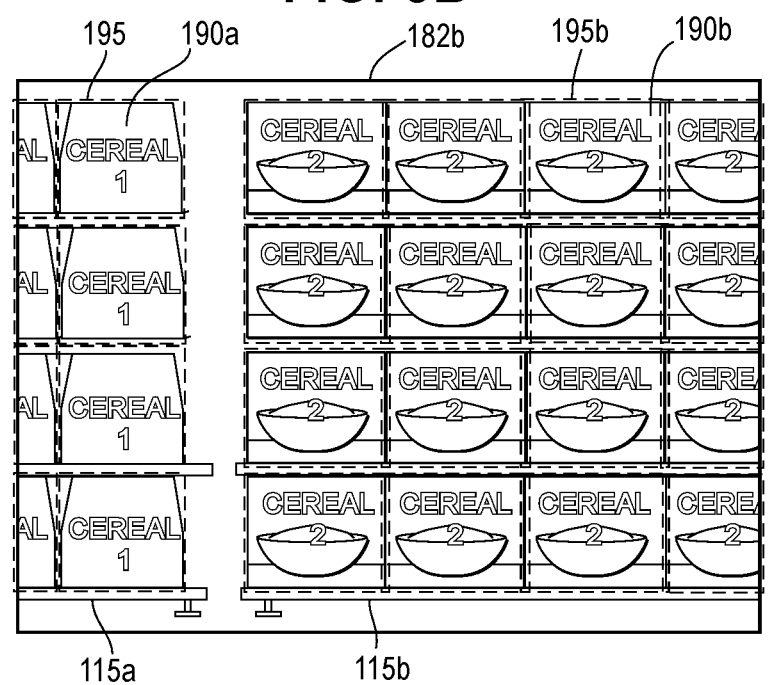
FIG. 5B is a diagram of the image of FIG. 4B, after the image is processed to detect the individual products and to generate a virtual boundary line around each of the individual products detected in the image.
Figure 5C:
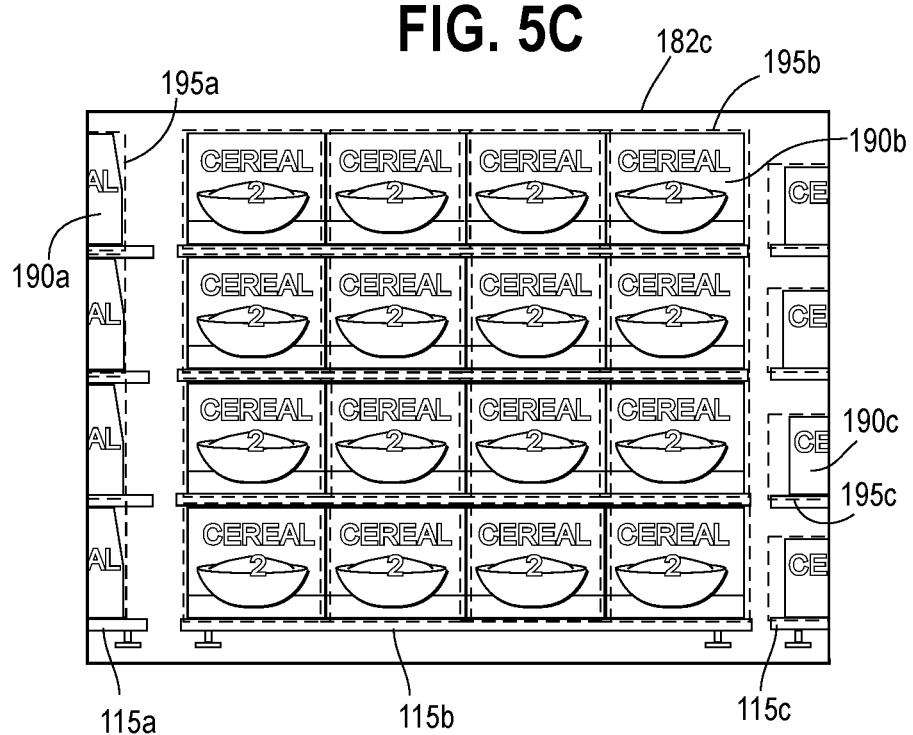
FIG. 5C is a diagram of the image of FIG. 4C, after the image is processed to detect the individual products and to generate a virtual boundary line around each of the individual products detected in the image.
Figure 5D:
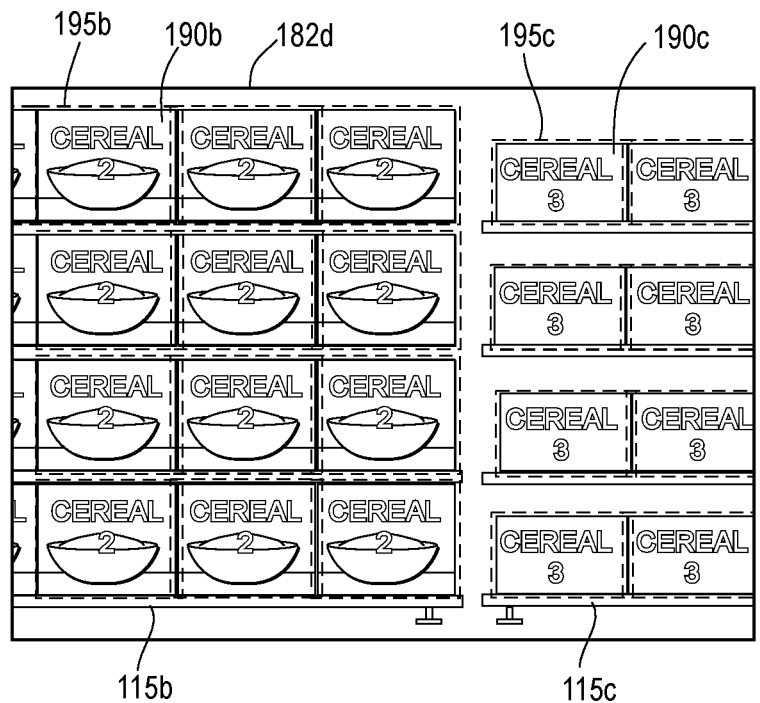
FIG. 5D is a diagram of the image of FIG. 4D, after the image is processed to detect the individual products and to generate a virtual boundary line around each of the individual products detected in the image.
Figure 5E:
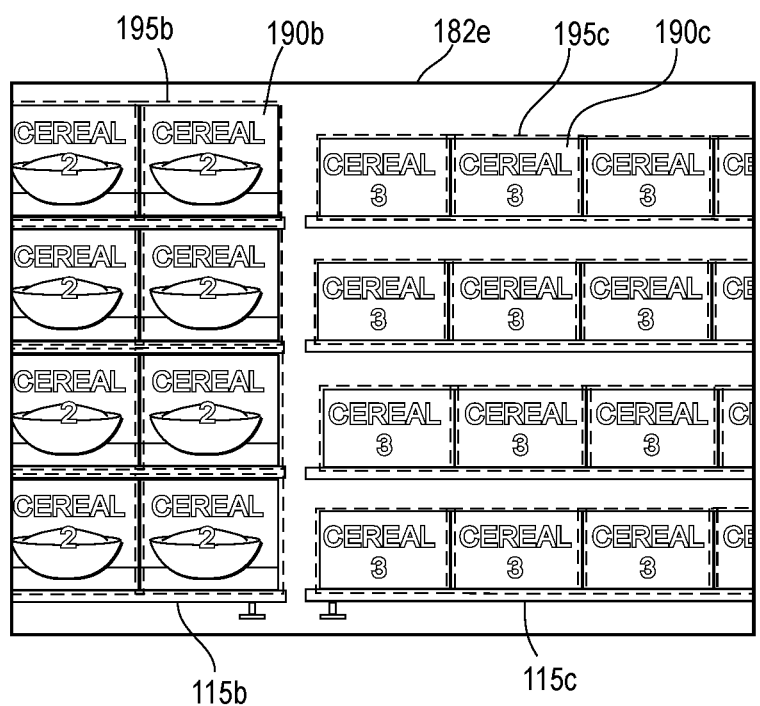
FIG. 5E is a diagram of the image of FIG. 4E, after the image is processed to detect the individual products and to generate a virtual boundary line around each of the individual products detected in the image.
Figure 6A:
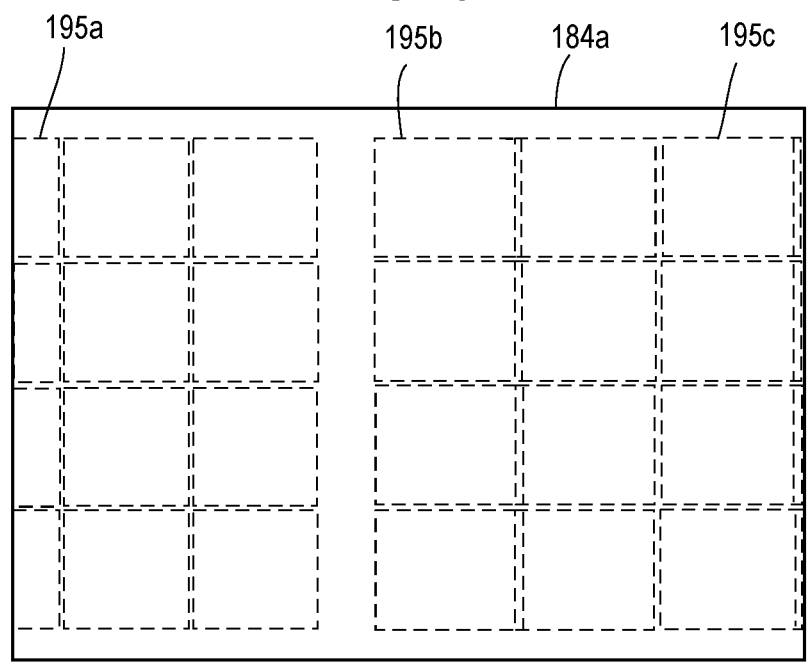
FIG. 6A is a diagram of the image of FIG. 5A, after the image is processed to cluster the virtual boundary lines to determine a number of adjacent storage structures (e.g., shelves, pallets, etc.) detected in the image.
Figure 6B:
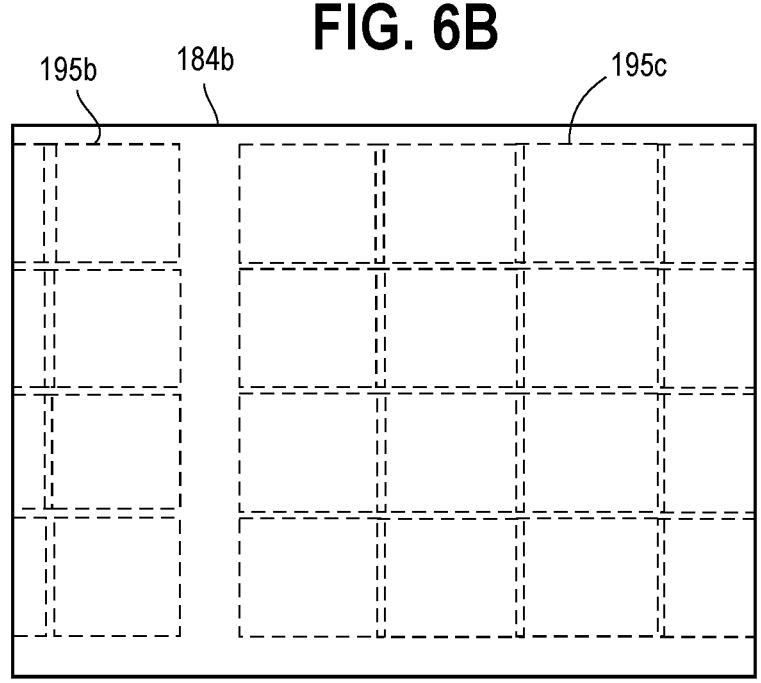
FIG. 6B is a diagram of the image of FIG. 5B, after the image is processed to cluster the virtual boundary lines to determine a number of adjacent storage structures detected in the image.
Figure 6C:
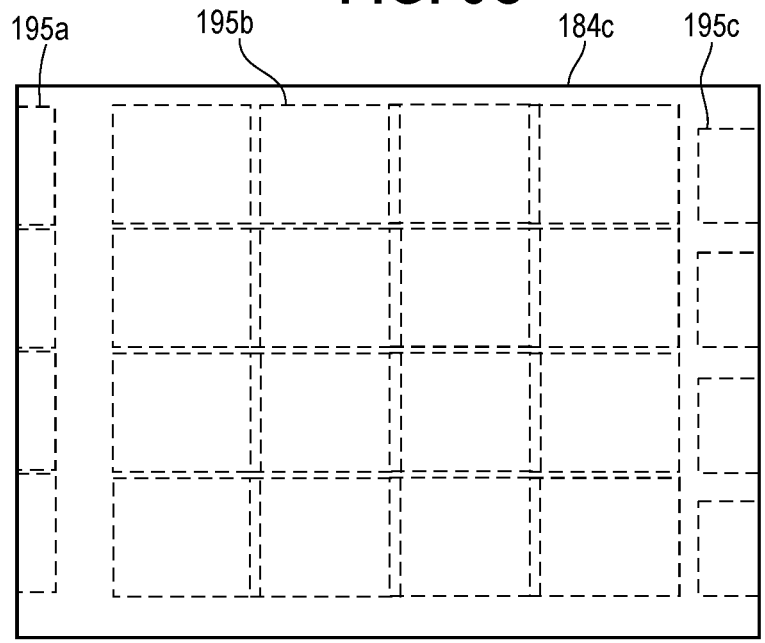
FIG. 6C is a diagram of the image of FIG. 5C, after the image is processed to cluster the virtual boundary lines to determine a number of adjacent storage structures detected in the image.
Figure 6D:
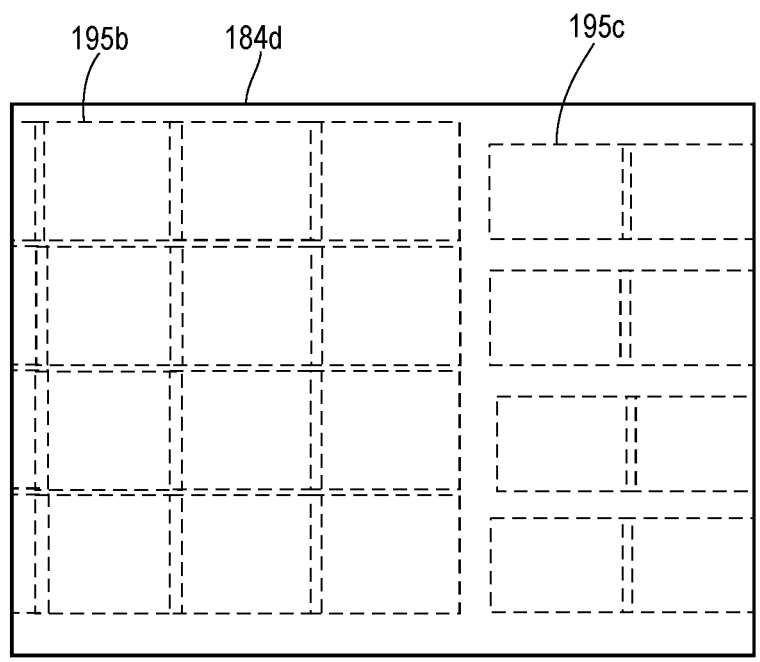
FIG. 6D is a diagram of the image of FIG. 5D, after the image is processed to cluster the virtual boundary lines to determine a number of adjacent storage structures detected in the image.
Figure 6E:
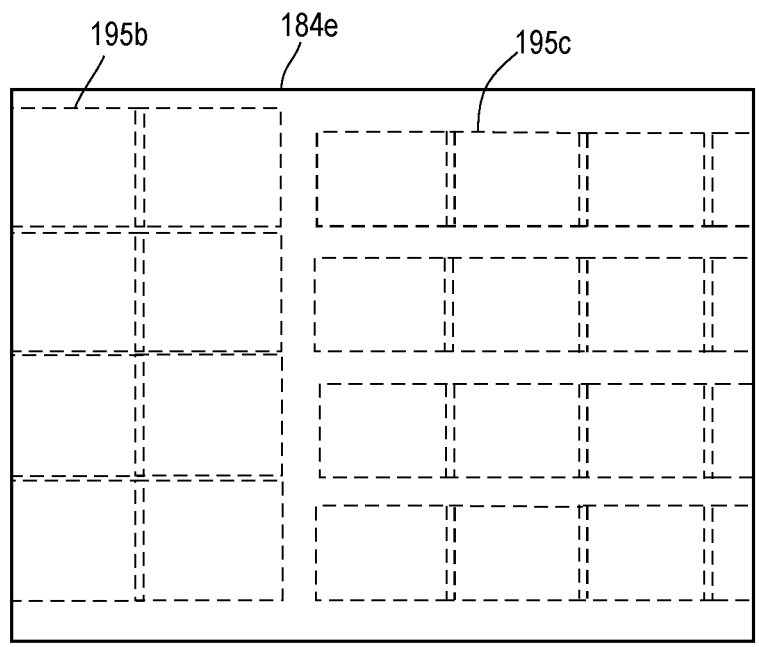
FIG. 6E is a diagram of the image of FIG. 5E, after the image is processed to cluster the virtual boundary lines to determine a number of adjacent storage structures detected in the image.

In some embodiments, after generating the virtual boundary lines 195a-195c in the images 182a-182e as shown in FIGS. 5E-5E, the control circuit 310 of the computing device 150 is programmed to further process the images 182a-182e (as will be described in more detail below with reference to FIGS. 6A-6E and FIG. 7) to identify one or more product storage structures 115a-115c located in the product storage area 110 and storing groups of identical products 190a-190c thereon. In a further aspect, after the control circuit 310 identifies the portions of the product storage structures 115a-115c present in each of the images 182a-182c, the control circuit 310 is programmed to analyze each of the images 182a-182e (as will be described in more detail below with reference to FIGS. 6A-6E and FIG. 7) to determine whether the series of images 182a-182e contains a single image (in this case, 182c), which fully shows the product storage structure 115b of interest and fully shows each of the individual identical products 190b stored on the first product storage structure 115b of interest.

In some embodiments, after generating the virtual boundary lines 195a-195c, identifying the portions of the product storage structures 115a-115c present in each of the images 182a-182c, and identifying the image 182c that fully shows the first product storage structure 115b and fully shows each of the individual products 190b stored on the first product storage structure 115b, the control circuit 310 of the computing device 150 is programmed to cause the computing device 150 to transmit a signal including the selected image 182c over the network 130 to the electronic database 140 for storage.

In one aspect, this image 182c may be used by the control circuit 310 in subsequent image detection operations and/or training or retraining a neural network model as a reference model of an optimal single-image visual representation of the product storage structure 115b while being fully stocked with products 190b thereon. More specifically, in some implementations, the control circuit 310 is programmed to perform product detection analysis with respect to images subsequently captured by the image capture device 120 by utilizing machine learning/computer vision modules/models 322 that may include one or more neural network models trained using the image data stored in the electronic database 140. Notably, in certain aspects, the machine learning/neural network modules/models 322 may be retrained based on physical inspection of the product storage structure 115a-115c by a worker of the product storage facility, and in response to an input received from an electronic user device 160 of the worker, for example, indicating that some of the products 190b stocked at the product storage structure 115b were different from one another (which should not be the case, since each product storage structure 115a-115c is intended to stock a group of identical products 190a-190c thereon).

FIG. 7 shows exemplary logic flow of an exemplary method 700 of monitoring inventory at a product storage facility 105 via processing digital images of various product storage areas 110 of the product storage facility 105. The method 700 includes obtaining, by the computing device 150, a series of images that include the five images 180a-180c of a product storage area 110 captured by the image capture device 120 during the movement of the image capture device 120 about the product storage facility 105 (step 710).

As mentioned above, while FIGS. 4A-4E of this application respectively show (for ease of illustration) only five images 180a-180e of the product storage area 110 and describe the analysis of these five images 180a-180e by the control circuit 310 of the computing device 150, it will be appreciated that, in some embodiments, the control circuit 310 may process and analyze dozens or hundreds of images of the product storage area 110 that are captured (at predetermined intervals) by the image capture device 120 while moving about the product storage facility 105, and the images 180a-180e may be processed by the control circuit 310 as raw images 180a-180e or as processed images 182a-182e (e.g., pre-processed by an image-processing and/or neural network-based internet-based service 170).

In the exemplary method 700, after the computing device 150 obtains a series of images 180a-180e of a given product storage area 110, the control circuit 310 calculates the relative location information between each pair of adjacent images in the set of five images 180a-180e (step 720). In some aspects, the processing of the images 180a-180e by the control circuit 310 may be done using homographies (e.g., calculating overlap between the images 180a-180e), or by using meta data and intrinsic parameters of the camera sensor 214 of the image capture device 120 (which may be obtained by the computing device 150 from the image capture device 120).

In the exemplary method 700, based on the processing of multiple images of a product storage area 110 of interest to determine the relative location information in step 720, the control circuit 310 is programmed to identify the fewest number of images (in this case, five images 180a-180e) that provide a full covering of a product storage structure of interest, in this case, the product storage structure 115b (step 730). After selecting the group of images 180a-180e that provide full coverage of the product storage structure 115b, the control circuit 310 processes the images 180a-180e as described above to (e.g., by utilizing a web-/cloud-based service 170 and/or a computer vision/machine learning/neural network module/model 322) detect the products 190a-190c present in the images 180a-180e (steps 740a-e).

With reference to FIG. 7, after the images 180a-180e obtained by the computing device 120 are processed by the control circuit 310 to generate the images 182a-182e including virtual boundary lines (also referred to as virtual bounding boxes) 195a-195c around each of the individual products 190a-190c, the method 700 further includes processing the images 182a-182e to merge the virtual bounding boxes 195a-195c into a global coordinate (step 750). In one embodiment, this step may include the control circuit 310 executing a light-weighted object detection model to aggregate the virtual bounding boxes 195a-195c using the relative location information obtained in step 720.

In one aspect, the processing of the images 182a-182e by the control circuit 310 of the computing device 150 to aggregate the virtual bounding boxes 195a-195c results in images 184a-184e shown in FIGS. 6A-6E. After generating the images 184a-184e depicting the aggregated virtual bounding boxes 195a-195c as shown in FIGS. 6A-6E, the method 700 further includes the control circuit 310 processing the images 184a-184e by utilizing a clustering algorithm to predict which of the virtual bounding boxes 195a-195c are representative of identical individual products 190a-190c stored as a group on a single product storage structure 115a-115c (step 760). For example, during the processing of the image 182a in FIG. 6A using the clustering algorithm, the control circuit 310 is able to determine that one of the adjacent product stacks (i.e., the one on the left) contains products 190a that are all identical to each other in size and shape, and that that the other of the adjacent product stacks (i.e., the one on the right) contains products 190b that are all identical to each other in size and shape, but have a size and shape different from the products 190a in the other product stack. As such, the control circuit 310 is able to analyze the clustering algorithm-based data to determine that the image 184a contains two adjacent product storage structures 115a and 115b, each containing stack of different products 115a or 115b thereon.

With reference back to FIG. 7, after the control circuit 310 identifies individual stacks of identical products 190a-190c on their respective product storage structures 115a-115c in the images 184a-184e, the method 700 further includes the control circuit 310 analyzing the images 184a-184e to determine which of the images 184a-184e provides the "best," i.e., the most complete view of a product cluster stacked on the product storage structure 115b of interest (step 770).

In some embodiments, the control circuit 310 is programmed to interpret an image to be the best visual representation of the product storage structure 115b of interest when the image fully shows the product storage structure 115b and fully shows each of the individual identical products 190b stored as a stack on the product storage structure 115b. With respect to the processing and analysis of the exemplary set of images 184a-184e shown in FIGS. 6A-6E, the method 700 would conclude with the control circuit 310 of the computing device 150 determining that the image 180c of FIG. 4C captured by the image capture device 120 (which corresponds to the image 182c of FIG. 5C and the image 184c of FIG. 6C) is the best representative image of the product storage structure 115b (step 780).

In some aspects, after identifying the best image (i.e., image 180c) representative of the product storage structure 115b, the control circuit 310 is programmed to cause the computing device 150 to transmit a signal including the image 180c over the network 130 to the electronic database 140 for storage. On the other hand, to avoid taking up storage space in the electronic database 140 with the four other images in the processed five-image set, in some embodiments, the control circuit 310 is programmed to discard (i.e., delete instead of sending to the database 140) the images 180a, 180b, 180d, and 180d that only partially show the product storage structure 115b, unlike the image 180c, which fully shows the product storage structure 115b (which, as mentioned above, may be a pallet, a shelf cabinet, a single shelf, or another product display case).

With reference to FIG. 8, an exemplary method 800 of operation of the system 100 for monitoring inventory of a product storage facility 105 is described. The method 800 includes capturing, from multiple viewing angles, images 180a-180e of a product storage area 110 of the product storage facility 105 storing a plurality of products 190a-190c via an image capture device 120 moving about the product storage area 110 and having a field of view that includes the product storage area 110 (step 810). In certain implementations, step 810 may include a motorized (autonomous or human-operated) or a non-motorized human-operated image capture device 120 moving about the product storage facility 105 and about the product storage area 110 while capturing, via a camera sensor 214 of the image capture device 120, a series of digital images 180a-180e of the product storage structures 115a-115c at predetermined intervals (e.g., 1 second, 2 seconds, 3 seconds, 5 seconds, etc.) programmed into the control circuit 206 of the image capture device 120.

As such, for a product storage area 110 that includes three product storage structures 115a-115c, the series of images 180a-180c captured by the image capture device 120 during the movement thereof may depict: a portion of product storage structure 115a and a portion of product storage structure 115b (FIG. 4A); a comparatively smaller portion of the product storage structure 115a and a comparatively larger portion of the product storage structure 115b (FIG. 4B); a portion of two product storage structures 115a and 115c and the entire product storage structure 115b (FIG. 4C); a portion of the product storage structure 115b and a portion of the product storage structure 115c (FIG. 4D); a comparatively smaller portion of the product storage structure 115b and a comparatively larger portion of the product storage structure 115c (FIG. 4E).

With reference back to FIG. 8, the method 800 further includes several actions performed by a computing device 150 including a control circuit 310 and communicatively coupled to the image capture device 120. First, the method 800 includes obtaining the images 180a-180e of the product storage area 110 captured by the image capture device 120 (step 820). As pointed out above, the computing device 150 may obtain the images 180a-180e directly from the image capture device 120 (e.g., over the network 130 via the wireless transceiver 212 of the image capture device and the input/output 340 of the computing device 150), or from the electronic database 140 (e.g., over the network 130 via the input/output 340 of the computing device over the network 130), or from an internet-based service 170 (which may process the images 180a-180e as described above to result in the images 182a-182e, such that, in step 820, the computing device 150 does not obtain the raw images 180a-180e, but obtains the processed images 182a-182e).

After the images 180a-180e are obtained by the computing device 150, the method 800 further includes processing each of the obtained images 180a-180e of the product storage area 110 to detect individual ones of each of the products 190a-190c captured in each of the obtained images 180a-180e (step 830). As pointed out above, in some aspects, the control circuit 310 processes the data extracted from each image 180a-180e via computer vision and/or one or more trained neural network modules/models 322 in order to detect each of the individual products 190a-190c located at their respective product storage structures 115a-115c in each of the images 180a-180e, and to generate virtual boundary lines 195a-195c (see images 182a-182e in FIGS. 5A-5E) around each one of the individual products 190a-190c detected in the images 180a-180e.

After the images 180a-180e are processed by the control circuit 310 of the computing device 150 to detect the individual products 190a-190c within the images 180a-180e and to generate virtual boundary lines 195a-195c (also referred to as bounding boxes) around each of the individual products 190a-190c (see images 182a-182e in FIGS. 5A-5E), the method 800 further includes identifying at least a first product storage structure 115b located in the product storage area 110 that stores a first group of identical products 190b thereon (step 840). As pointed out above, in some embodiments, the control circuit 310 processes the images 182a-182e to aggregate the virtual bounding boxes 195a-195c as shown in the resulting images 184a-184e of FIGS. 6A-6E. In one aspect, the control circuit 310 processes the images 184a-184e by utilizing a clustering algorithm to predict which of the virtual bounding boxes 195a-195c are representative of identical individual products 190a-190c stored as a group on a single product storage structure 115a-115c. As such, based on the clustering algorithm, the control circuit 310 is able to determine that a given image (e.g., image 184d in FIG. 6D) contains two adjacent stacks of different products 115b and 115c, which represent two adjacent product storage structures 115b and 115c.

The method 800 further includes analyzing each of the obtained images 180a-180e to identify and select a single image (see image 180c in FIG. 4C) that fully shows the first product storage structure 115b and fully shows each of the products 190b in the group of identical products 190b stored on the first product storage structure 115b (step 850). As such, the method 800 results in, from a series of images 180a-180e of a given product storage structure 115b, a selection of a single image 180c that represents the "best"/ "most complete" visual representation of the product storage structure 115b, together with all of the products 190b stored on that product storage structure 115b. In some aspects, after identifying the best image (i.e., image 180c) representative of the product storage structure 115b, the control circuit 310 causes the computing device 150 to transmit a signal including the image 180c over the network 130 to the electronic database 140 for storage. In other aspects, the control circuit 310 discards/deletes the images 180a, 180b, 180d, and 180d that only partially show the product storage structure 115b instead of transmitting these images to the electronic database 140 for storage, thereby saving storage space.

The above described exemplary embodiments advantageously provide for inventory management systems and methods, where the individual products stocked on product storage structures at product storage facilities of a retailer can be detected by processing images obtained from an image capture device that moves about the product storage facilities and captures images of product storage areas of the product storage facilities. As such, the systems and methods described herein provide for an efficient and precise monitoring of on-hand product inventory at a product storage facility and provide a significant cost savings to the product storage facility by saving the product storage facility thousands of worker hours that would be normally spent on manual on-hand product availability monitoring.

This application is related to the following applications, each of which is incorporated herein by reference in its entirety: entitled SYSTEMS AND METHODS OF IDENTIFYING INDIVIDUAL RETAIL PRODUCTS IN A PRODUCT STORAGE AREA BASED ON AN IMAGE OF THE PRODUCT STORAGE AREA filed on Oct. 11, 2022, application Ser. No. 17/963,802; entitled CLUSTERING OF ITEMS WITH HETEROGENEOUS DATA POINTS filed on Oct. 11, 2022, application Ser. No. 17/963,903; and entitled SYSTEMS AND METHODS OF TRANSFORMING IMAGE DATA TO PRODUCT STORAGE FACILITY LOCATION INFORMATION filed on Oct. 11, 2022, application Ser. No. 17/963,751.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for monitoring inventory of a product storage facility, the system comprising:
an image capture device having a field of view that includes a product storage area of the product storage facility having products arranged therein, wherein the image capture device is configured to:
move about the product storage area; and
capture a plurality of images of the product storage area from a plurality of viewing angles; and
a computing device including a control circuit, the computing device being communicatively coupled to the image capture device, the control circuit being configured to:
obtain the plurality of images of the product storage area captured by the image capture device;
process each of the obtained images of the product storage area to detect individual ones of each of the products captured in each of the obtained images;
based on detection of the individual ones of each of the products captured in each of the obtained images, identify at least a first product storage structure located in the product storage area that stores a first group of identical products thereon;
calculate, for each pair of consecutively captured images of the plurality of images, location information representing a difference in depicted locations between the pair of consecutively captured images;
generate, based on the location information, a set of images of the plurality of images that each at least partially depict the first product storage structure;
generate a modified set of images comprising the set of images and a plurality of virtual bounding boxes, each virtual bounding box of the plurality of virtual bounding boxes surrounding an individual product depicted in the set of images;
process the modified set of images using a clustering algorithm to determine a first group of bounding boxes of the plurality of virtual bounding boxes representative of the first group of identical products;
based on the first group of bounding boxes, identify and select a single image that fully shows the first product storage structure and fully shows each of the products in the first group of identical products stored on the first product storage structure; and
transmit the single image to an electronic database for use in monitoring inventory at the product storage facility.

2. The system of claim 1, wherein the image capture device comprises a motorized robotic unit that includes wheels that permit the motorized robotic unit to move about the product storage facility, and a camera to permit the motorized robotic unit to capture the plurality of images of the product storage area from the plurality of viewing angles.

3. The system of claim 2, wherein the image capture device is configured to transmit, to the computing device, one or more signals including the plurality of images of the product storage area captured by the camera.

4. The system of claim 1, wherein the control circuit is programmed to cluster the plurality of virtual bounding boxes in each of the obtained images to determine a number of adjacent product storage structures in the product storage area present in each of the obtained images.

5. The system of claim 4, wherein the adjacent product storage structures are pallets or shelves.

6. The system of claim 4, wherein the control circuit is programmed to analyze the clustered plurality of virtual bounding boxes in each of the obtained images to identify the first product storage structure located in the product storage area that stores the first group of identical products thereon.

7. The system of claim 6, wherein the control circuit is programmed to analyze the clustered plurality of virtual bounding boxes in each of the obtained images to identify at least a second product storage structure located in the product storage area that stores a second group of identical products thereon, wherein the products of the second group of identical products are different from the products of the first group of identical products.

8. The system of claim 1, wherein the control circuit is programmed to not send to the electronic database and discard the obtained images that do not fully show the first product storage structure or do not fully show each of the products in the first group of identical products stored on the first product storage structure.

9. A method of monitoring inventory of a product storage facility, the method comprising:

capturing, from a plurality of viewing angles, a plurality of images of a product storage area of the product storage facility having products arranged therein via an image capture device moving about the product storage area and having a field of view that includes the product storage area; and by a computing device including a control circuit, the computing device being communicatively coupled to the image capture device:

obtaining the plurality of images of the product storage area captured by the image capture device;

processing each of the obtained images of the product storage area to detect individual ones of each of the products captured in each of the obtained images;

based on detection of the individual ones of each of the products captured in each of the obtained images, identifying at least a first product storage structure located in the product storage area that stores a first group of identical products thereon;

calculating, for each pair of consecutively captured images of the plurality of images, location information representing a difference in depicted locations between the pair of consecutively captured images;

generating, based on the location information, a set of images of the plurality of images that each at least partially depict the first product storage structure;

generating a modified set of images comprising the set of images and a plurality of virtual bounding boxes, each virtual bounding box of the plurality of virtual bounding boxes surrounding an individual product depicted in the set of images;

processing the modified set of images using a clustering algorithm to determine a first group of bounding boxes of the plurality of virtual bounding boxes representative of the first group of identical products;

based on the first group of bounding boxes, identifying and selecting a single image that fully shows the first product storage structure and fully shows each of the products in the first group of identical products stored on the first product storage structure; and transmitting the single image to an electronic database for use in monitoring inventory at the product storage facility.

10. The method of claim 9, wherein the image capture device comprises a motorized robotic unit that includes wheels that permit the motorized robotic unit to move about the product storage facility, and a camera to permit the motorized robotic unit to capture the plurality of images of the product storage area from the plurality of viewing angles.

11. The method of claim 10, further comprising transmitting, from the image capture device to the computing device, one or more signals including the plurality of images of the product storage area captured by the camera.

12. The method of claim 9, further comprising, by the control circuit, clustering the plurality of virtual bounding boxes in each of the obtained images to determine a number of adjacent product storage structures in the product storage area present in each of the obtained images.

13. The method of claim 12, wherein the adjacent product storage structures are pallets or shelves.

14. The method of claim 12, further comprising, by the control circuit, analyzing the clustered plurality of virtual bounding boxes in each of the obtained images to identify the first product storage structure located in the product storage area that stores the first group of identical products thereon.

15. The method of claim 14, further comprising, by the control circuit, analyzing the clustered plurality of virtual bounding boxes in each of the obtained images to identify at least a second product storage structure located in the product storage area that stores a second group of identical products thereon, wherein the products of the second group of identical products are different from the products of the first group of identical products.

16. The method of claim 9, further comprising, by the control circuit, not sending to the electronic database and discarding the obtained images that do not fully show the first product storage structure or do not fully show each of the products in the first group of identical products stored on the first product storage structure.

* * * * *